US012293309B2

(12) United States Patent
Schnitt

(10) Patent No.: US 12,293,309 B2
(45) Date of Patent: May 6, 2025

(54) INVOICE CLASSIFICATION AND APPROVAL SYSTEM

(71) Applicant: David Schnitt, Rancho Palos Verdes, CA (US)

(72) Inventor: David Schnitt, Rancho Palos Verdes, CA (US)

( * ) Notice: Subject to any disclaimer, the term of this patent is extended or adjusted under 35 U.S.C. 154(b) by 0 days.

(21) Appl. No.: 16/505,666

(22) Filed: Jul. 8, 2019

(65) Prior Publication Data

US 2020/0013098 A1 Jan. 9, 2020

Related U.S. Application Data

(60) Provisional application No. 62/694,445, filed on Jul. 6, 2018.

(51) Int. Cl.
| | |
|---|---|
| *G06Q 10/00* | (2023.01) |
| *G06F 40/258* | (2020.01) |
| *G06Q 30/04* | (2012.01) |
| *G06F 40/166* | (2020.01) |

(52) U.S. Cl.
CPC .......... *G06Q 10/00* (2013.01); *G06F 40/258* (2020.01); *G06Q 30/04* (2013.01); *G06F 40/166* (2020.01)

(58) Field of Classification Search
CPC ...... G06Q 30/04; G06Q 10/00; G06F 40/258; G06F 40/166; G06K 9/00442; G06K 2209/01
USPC .......................................................... 705/34
See application file for complete search history.

(56) References Cited

U.S. PATENT DOCUMENTS

| | | | |
|---|---|---|---|
| 8,165,934 B2 | 4/2012 | Manista | |
| 9,245,291 B1* | 1/2016 | Ballaro | .............. G06Q 30/0635 |
| 10,127,444 B1* | 11/2018 | Burch | .................. G06V 30/414 |
| 10,241,992 B1* | 3/2019 | Middendorf | ........... G06N 20/00 |
| 2003/0055755 A1* | 3/2003 | Shuder | ............... G06Q 10/1091 |
| | | | 705/32 |
| 2005/0038721 A1* | 2/2005 | Goeckel | ................. G06Q 10/10 |
| | | | 705/30 |
| 2005/0278232 A1* | 12/2005 | Bruffey | .................. G06Q 40/12 |
| | | | 705/30 |
| 2009/0319402 A1* | 12/2009 | Manista | ................. G06Q 40/12 |
| | | | 705/30 |
| 2017/0098258 A1* | 4/2017 | Dikmen | ................. G06Q 30/04 |
| 2017/0293951 A1 | 10/2017 | Nolan et al. | |
| 2018/0144314 A1* | 5/2018 | Miller | .................. G06Q 20/405 |
| 2018/0308178 A1* | 10/2018 | Engler | ..................... G06N 5/02 |

OTHER PUBLICATIONS

Harris, Stephen Luke. Invoice System. Diss. Dublin, National College of Ireland, 2017 (Year: 2017).*

(Continued)

*Primary Examiner* — Andrew T McIntosh
(74) *Attorney, Agent, or Firm* — LIU & LIU

(57) ABSTRACT

A method and system for managing and automating the classification of non-purchase order invoices for organizations. A centralized server applies rules to properly apply general ledger account coding for invoices based on data contained in the invoice. The server then electronically routes the invoice for approval to the appropriate approvers in the organization. In the absence of rules, the system applies machine learning to learn the correct rules, to be applied the next time said invoice is received and processed.

29 Claims, 21 Drawing Sheets

(56) References Cited

OTHER PUBLICATIONS

Van Bekkum, Michael, and Jasper Roes. "Standard for Invoicing 1.2." (2011) (Year: 2011).*

Kwok, Thomas, Jim Laredo, and Sridhar Maradugu. "A web services integration to manage invoice identification, metadata extraction, storage and retrieval in a multi-tenancy SaaS application." 2008 IEEE International Conference on e-Business Engineering. IEEE, 2008 (Year: 2008).*

International Search Report of Counterpart PCT International Application No. PCT/US2019/040897.

* cited by examiner

Fig. 3.1

| Vendor Category | Location | Vendor(s) | Zero Level Approver | First Level Approver | Second Level Approver | Third Level Approver | Fourth Level Approver | Fifth Level Approver |
|---|---|---|---|---|---|---|---|---|
| General Office Expenses | Corporate 1000 | Vendor1, Vendor2, Vendor3, Vendor4 | | Joanna C Center Manager Up To $1,000 | | Maureen M Vice President Up To $25,000 | | Marshal S Chief Operating Officer Greater Than $100,000 |
| | <All Other Locations> | <All Other Vendors> | | General Manager Up To $1,000 | Director Up To $10,000 | Vice President Up To $25,000 | President or CFO Up To $100,000 | Marshal S Chief Operating Officer Greater Than $100,000 |
| | | Vendor5 | | | Mike J Director Up To $10,000 | Charles S Vice President Up To $25,000 | | |
| Equipment / Maintenance | Corporate 1000 | Vendor6 | | | | Charles S Vice President Up To $25,000 | | |
| | <All Locations> | <All Other Vendors> | Luz G Accounting Supervisor, Reporting | | Mike J Director Up To $10,000 | Charles S Vice President Up To $25,000 | Brian R Chief Financial Officer Up To $100,000 | Marshal S Chief Operating Officer Greater Than $100,000 |
| | | Vendor7 | | | Mike J Director Up To $10,000 | Charles S Vice President Up To $25,000 | Brian R Chief Financial Officer Up To $100,000 | Marshal S Chief Operating Officer Greater Than $100,000 |
| | <All Other Locations> | <All Other Vendors> | | General Manager Up To $1,000 | Director Up To $10,000 | Vice President Up To $25,000 | President or CFO Up To $100,000 | Marshal S Chief Operating Officer Greater Than $100,000 |
| Human Resources | | Vendor8, Vendor9 | Marjan K HR Business Partner | | Kim S Director Up To $10,000 | Maureen M Vice President Up To $25,000 | | Marshal S Chief Operating Officer Greater Than $100,000 |
| | Corporate 1000 | Vendor10, Vendor11 | | | | Maureen M Vice President Up To $25,000 | | Marshal S Chief Operating Officer Greater Than $100,000 |
| | <All Other Locations> | <All Other Vendors> | | | Kim S Director Up To $10,000 | Maureen M Vice President Up To $25,000 | Brian R Chief Financial Officer Up To $100,000 | Marshal S Chief Operating Officer Greater Than $100,000 |

| Region | Location | Zero Level Approver | First Level Approver | Second Level Approver | Third Level Approver | Fourth Level Approver | Fifth Level Approver |
|---|---|---|---|---|---|---|---|
| Atlanta | Atlanta Region 4510 | | | | Marilee D<br>Vice President<br>Up To 25,000 | Vinnie D<br>President<br>Up To $100,000 | Marshal S<br>Chief Operating Officer<br>Greater Than $100,000 |
| | Lawrenceville 4512 | | Gary T<br>General Manager<br>Up To $1,000 | | Marilee D<br>Vice President<br>Up To 25,000 | Vinnie D<br>President<br>Up To $100,000 | Marshal S<br>Chief Operating Officer<br>Greater Than $100,000 |
| | Decatur 4513 | | Chiquita W<br>General Manager<br>Up To $1,000 | | Marilee D<br>Vice President<br>Up To 25,000 | Vinnie D<br>President<br>Up To $100,000 | Marshal S<br>Chief Operating Officer<br>Greater Than $100,000 |
| | Conyers 4514 | | Eric E<br>General Manager<br>Up To $1,000 | | Marilee D<br>Vice President<br>Up To 25,000 | Vinnie D<br>President<br>Up To $100,000 | Marshal S<br>Chief Operating Officer<br>Greater Than $100,000 |
| | Covington 4515 | | Eric E<br>General Manager<br>Up To $1,000 | | Marilee D<br>Vice President<br>Up To 25,000 | Vinnie D<br>President<br>Up To $100,000 | Marshal S<br>Chief Operating Officer<br>Greater Than $100,000 |
| | Snellville 4518 | | Beverly R<br>General Manager<br>Up To $1,000 | | Marilee D<br>Vice President<br>Up To 25,000 | Vinnie D<br>President<br>Up To $100,000 | Marshal S<br>Chief Operating Officer<br>Greater Than $100,000 |
| | Gwinnett (North) 4541 | | Gary T<br>General Manager<br>Up To $1,000 | | Marilee D<br>Vice President<br>Up To 25,000 | Vinnie D<br>President<br>Up To $100,000 | Marshal S<br>Chief Operating Officer<br>Greater Than $100,000 |
| | Blairsville 4611 | | Eric E<br>General Manager<br>Up To $1,000 | | Marilee D<br>Vice President<br>Up To 25,000 | Vinnie D<br>President<br>Up To $100,000 | Marshal S<br>Chief Operating Officer<br>Greater Than $100,000 |
| | Gwinnett (South) 4612 | | Gary T<br>General Manager<br>Up To $1,000 | | Marilee D<br>Vice President<br>Up To 25,000 | Vinnie D<br>President<br>Up To $100,000 | Marshal S<br>Chief Operating Officer<br>Greater Than $100,000 |
| Central Florida | Central Florida Region 4180 | | | Joe K<br>Director<br>Up To $10,000 | | Vinnie D<br>President<br>Up To $100,000 | Marshal S<br>Chief Operating Officer<br>Greater Than $100,000 |
| | Leesburg 4181 | | Rebecca G<br>General Manager<br>Up To $1,000 | Joe K<br>Director<br>Up To $10,000 | | Vinnie D<br>President<br>Up To $100,000 | Marshal S<br>Chief Operating Officer<br>Greater Than $100,000 |
| | Lady Lake 4182 | | Rebecca G<br>General Manager<br>Up To $1,000 | Joe K<br>Director<br>Up To $10,000 | | Vinnie D<br>President<br>Up To $100,000 | Marshal S<br>Chief Operating Officer<br>Greater Than $100,000 |
| | Eustis 4814 | | Elizabeth C<br>General Manager<br>Up To $1,000 | Joe K<br>Director<br>Up To $10,000 | | Vinnie D<br>President<br>Up To $100,000 | Marshal S<br>Chief Operating Officer<br>Greater Than $100,000 |
| | Lady Lake Urology 4815 | | Elizabeth C<br>General Manager<br>Up To $1,000 | Joe K<br>Director<br>Up To $10,000 | | Vinnie D<br>President<br>Up To $100,000 | Marshal S<br>Chief Operating Officer<br>Greater Than $100,000 |
| Arizona | Arizona Region 4270 | | | Joe K<br>Director<br>Up To $10,000 | | Vinnie D<br>President<br>Up To $100,000 | Marshal S<br>Chief Operating Officer<br>Greater Than $100,000 |
| | Prescott 4272 | | Noel N<br>General Manager<br>Up To $1,000 | Dan A<br>Director<br>Up To $10,000 | | Vinnie D<br>President<br>Up To $100,000 | Marshal S<br>Chief Operating Officer<br>Greater Than $100,000 |
| | Prescott Valley 4273 | | | Dan A<br>Director<br>Up To $10,000 | | Vinnie D<br>President<br>Up To $100,000 | Marshal S<br>Chief Operating Officer<br>Greater Than $100,000 |
| | Chino Valley 4274 | | | Dan A<br>Director<br>Up To $10,000 | | Vinnie D<br>President<br>Up To $100,000 | Marshal S<br>Chief Operating Officer<br>Greater Than $100,000 |
| | MO Prescott 4277 | | | Dan A<br>Director<br>Up To $10,000 | | Vinnie D<br>President<br>Up To $100,000 | Marshal S<br>Chief Operating Officer<br>Greater Than $100,000 |
| | MO Prescott Valley 4278 | | | Dan A<br>Director<br>Up To $10,000 | | Vinnie D<br>President<br>Up To $100,000 | Marshal S<br>Chief Operating Officer<br>Greater Than $100,000 |
| California | Sherman Oaks 4080 | | Michelle M<br>General Manager<br>Up To $1,000 | Miranda J<br>Director<br>Up To $10,000 | Matt N<br>Vice President<br>Up To 25,000 | Vinnie D<br>President<br>Up To $100,000 | Marshal S<br>Chief Operating Officer<br>Greater Than $100,000 |

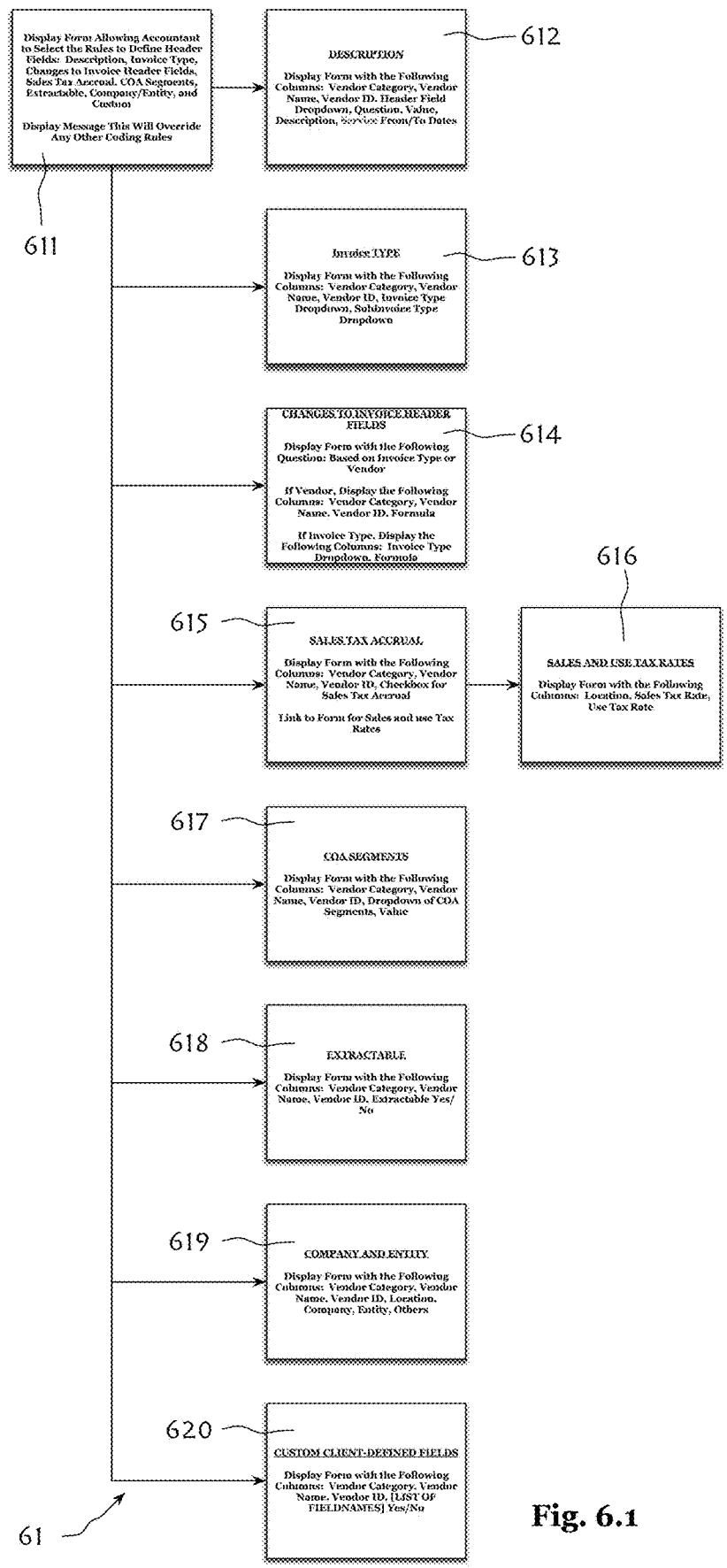
Fig. 6.1

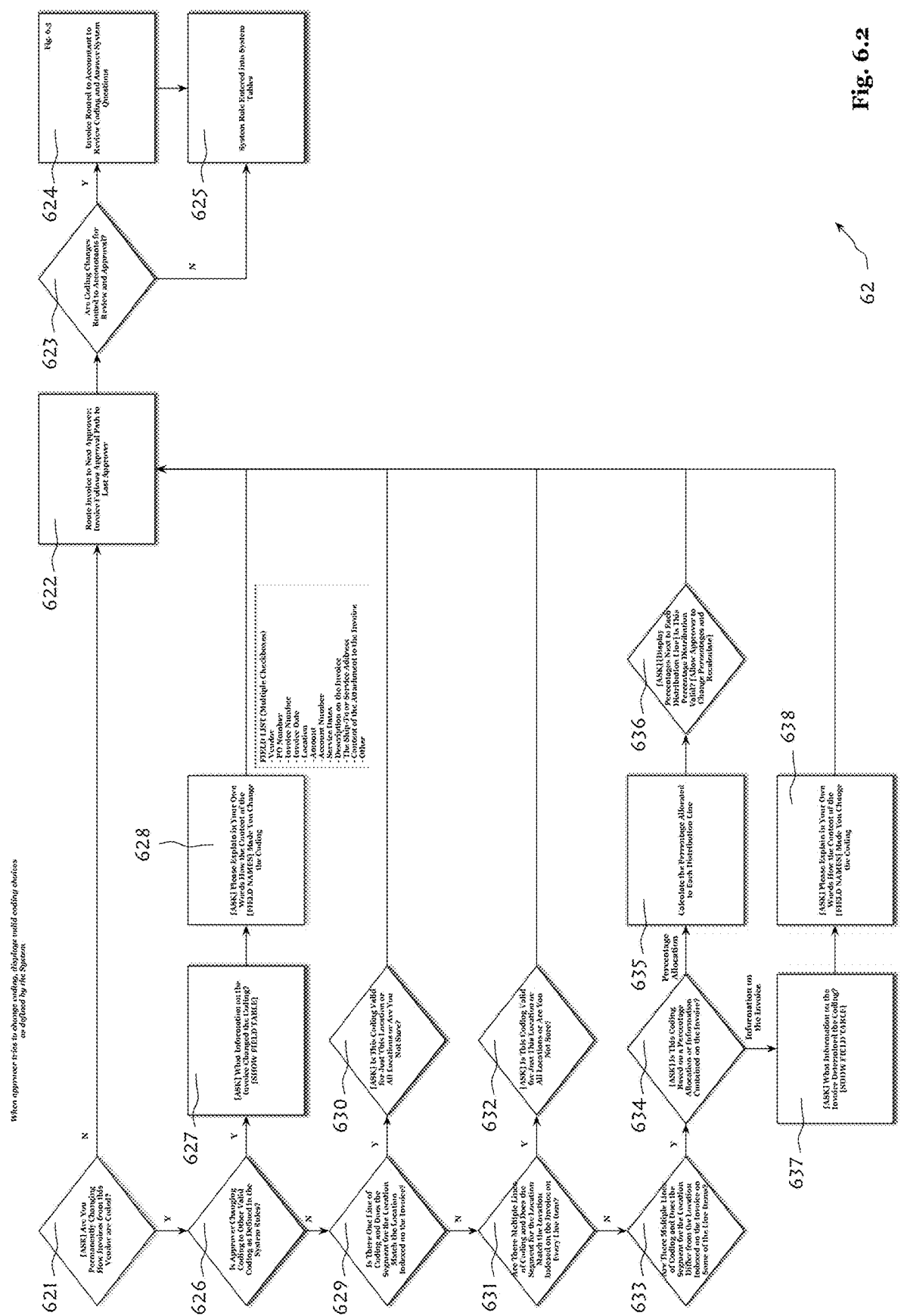
Fig. 6.2

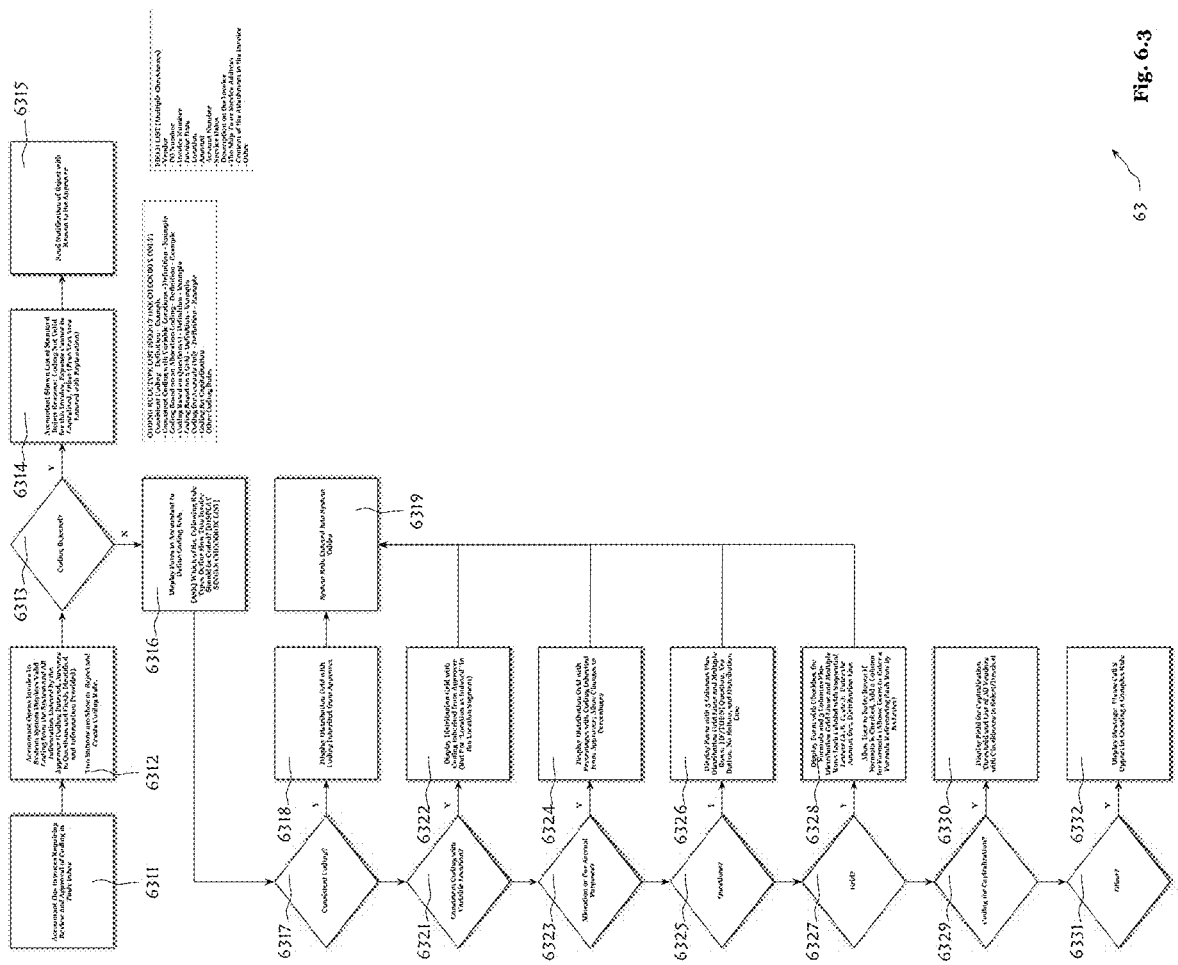
Fig. 6.3

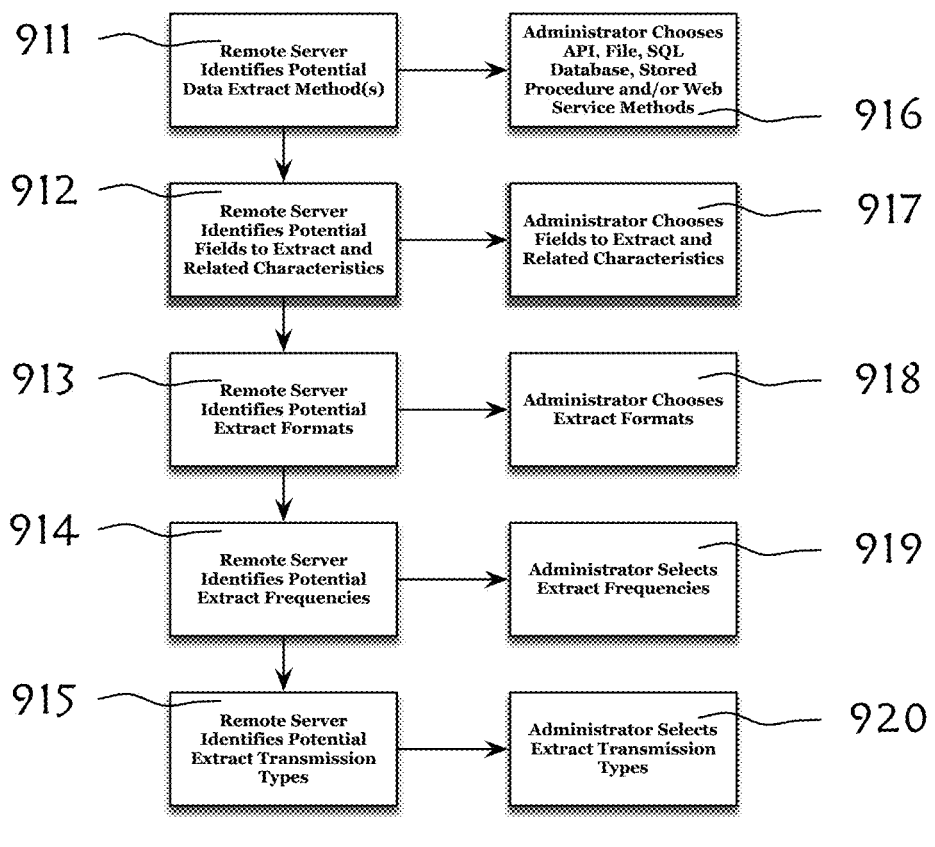
Fig. 7.1

Sick Metrics, Inc.
16701 East 99th Street
Tacoma, WA 98053

Invoice

| Date | Invoice # |
|---|---|
| 10/1/16 | 8493 |

| Bill To |
|---|
| Healthcare Company |
| Attn: Accounts Payable |
| 1500 Apollo Blvd. |
| Manhattan Beach, CA 90266 |

| Reference | Terms |
|---|---|
|  | Net 30 |

| Qty | Description | Rate | Amount |
|---|---|---|---|
| 660 | SickMetrics PEPM for eligibles outside of Washington State | 3.50 | 2,310.00 |
| 660 | Wellness Coaching PEPM - | 1.45 | 957.00 |
| 15 | Physician Form submission for Biometrics data input | 1.00 | 15.00 |

| | |
|---|---|
| Payments/Credits | $0.00 |
| Balance Due | $3,282.00 |

Fig. 9.1

Better Radiation Therapy
100 Radiation Way
New Haven, CT 01012

INVOICE

Invoice Number: 12311404

| Bill To: | Ship to: |
|---|---|
| Healthcare Company<br>Attn: Accounts Payable<br>1500 Apollo Blvd.<br>Manhattan Beach, CA 90266 | Healthcare Company<br>Attn: Accounts Payable<br>1500 Apollo Blvd.<br>Manhattan Beach, CA 90266 |

| Customer ID | Customer PO | Payment Terms | |
|---|---|---|---|
| Leesburg | | Net 30 Days | |
| Sales Rep ID | Shipping Method | Ship Date | Due Date |
| | Airborne | | 1/30/15 |

| Quantity | Item | Description | Unit Price | Amount |
|---|---|---|---|---|
| 1.00 | | AccuBoost Patients Treated - December 2014 | 3,000.00 | 3,000.00 |
| | | Subtotal | | 3,000.00 |
| | | Sales Tax | | 279.00 |
| | | Total Invoice Amount | | 3,279.00 |
| Check/Credit Memo No: | | Payment/Credit Applied | | |
| | | TOTAL | | 3,279.00 |

Fig. 9.3

| Purchase Order Number | Invoice Date | Invoice Number | Invoice Amount | Payment Due Date |
|---|---|---|---|---|
| | 10/08/16 | 2738657 | $702.99 | 11/01/16 |

Nature Of Service: Quarterly Billing

Current Charges:

11/01/16 - 01/31/17
Recurring Service
Amount: $702.99    Tax: $0.00    $702.99

Total Balance Due:    $702.99

Did you know... Failure to include your invoice could cause a delay in processing your payment.

Don't Forget to Include the Following With Your Payment:
Customer Number
Invoice Number

Customer Number:
01300 192706940

Business/Account Name:
Healthcare Company

Service Address:
5522 Sepulveda Blvd
Sherman Oaks, CA 91411-3437

It's fast and even more important - it's easy! You can save time and money paying your bill. Please see the back of your invoice to see how you can setup your account for automatic payments using your bank account!

Late Fee Policy: A late fee of 1.5% (or highest rate permitted by law, if less) per month will be assessed on the unpaid Total Balance Due when more than 30 days past due.

To pay this invoice and/or future recurring invoice by credit card, follow the instructions on the back of this invoice.

TEST YOUR ALARM SYSTEM MONTHLY TO CONFIRM YOUR SYSTEM IS OPERATIONAL

Page 1 of 2

An Alarm Company
10405 Cross Blvd.
Indianapolis, IN 46256

Healthcare Company
Attn: Accounts Payable
1500 Apollo Blvd.
Manhattan Beach, CA 90266

| Invoice Number: | 2738657 |
|---|---|
| Invoice Date: | 10/08/16 |
| Customer Number: | 01300 192706940 |
| Due Date: | 11/01/16 |

Please Pay This Amount    $702.99

Amount $ _____

▼ MAIL PAYMENT TO ▼

An Alarm Company
PO Box 371967
Philadelphia, PA 15233-6743

CITY OF ALFALFA
123 Main Street
Alfalfa, GA 30001

| Account Number | Billing Date | Due Date | Amount Due |
|---|---|---|---|
| 00026208 | 12/13/2016 | 01/04/2017 | $4,534.23 |

| | |
|---|---|
| Previous Balance | $5,419.76 |
| Payments | -$5,419.76 |
| Credits / Adjustments | $0.00 |
| Balance Forward | $0.00 |
| Current Charges | $4,534.23 |
| Total Amount Due | $4,534.23 |
| After Due Date | $4,784.17 |
| Disconnect Date | |

Healthcare Company
Attn: Accounts Payable
1500 Apollo Blvd.
Manhattan Beach, CA 90266

Service Address: 7177 ALFALFA ST

| Curr. Read Date | Prev. Read Date | Meter # | Service | Days | Curr. Read | Prev. Read | Usage | Units | Type |
|---|---|---|---|---|---|---|---|---|---|
| 12/05/16 | 11/04/16 | 11635040 | Demand | 31 | 41.52 | 0 | 58.12 | KW | A |
| 12/05/16 | 11/04/16 | 11638808 | Electric | 31 | 78435 | 58903 | 18437 | KWH | A |
| 12/05/16 | 11/04/16 | 30158875 | Gas | 31 | 953 | 733 | 220 | MCF | A |
| 12/05/16 | 11/04/16 | 19473894 | Water | 31 | 9403 | 9250 | 148000 | GAL | A |

| Description | Usage | $ Amount |
|---|---|---|
| ELECTRIC CHARGES | 18437 | $2,068.39 |
| ELECTRIC PCA | 22000 | $73.75 |
| ELECTRIC ECCR | 148000 | $143.81 |
| GAS CHARGES | 148000 | $213.43 |
| SEWER CHARGES | | $888.00 |
| WATER CHARGES | | $831.36 |
| BACKFLOW DEVICE | | $2.00 |
| SOLID WASTE | | $138.54 |
| SALES TAX | | $174.96 |

Message Center

Total Current Charges     4534.23
Balance Forward     0.00
Total Amount Due     $4,534.23

ACCOUNTS ARE SUBJECT TO A 10% PENALTY CHARGE IF PAYMENT IS NOT RECEIVED BY THE DUE DATE
Return this portion with your payment. Allow 5 days by mail.

| Account Number | Billing Date | Due Date |
|---|---|---|
| 00026208 | 12/13/2016 | 01/04/2017 |

| | |
|---|---|
| Balance Forward ($) | $0.00 |
| Amount Due ($) | $4,534.23 |
| After Due Date ($) | $4,784.17 |

MAKE CHECKS PAYABLE TO:
CITY OF ALFALFA
123 Main Street
Alfalfa, GA 30001

Healthcare Company
Attn: Accounts Payable
1500 Apollo Blvd.
Manhattan Beach, CA 90266

The Telephone Company
PO Box 1234
Columbus, OH 23456
Healthcare Company
Attn: Accounts Payable
1500 Apollo Blvd.
Manhattan Beach, CA 90266
Invoice
Fig. 9.6

INVOICE CLASSIFICATION AND APPROVAL SYSTEM

CROSS REFERENCE TO RELATED APPLICATIONS

This application claims the priority of Provisional Patent Application No. 62/694,445, which was filed Jul. 6, 2018. This earlier application and all patent documents and other publications disclosed herein below are fully incorporated by reference, as if fully set forth herein.

BACKGROUND OF THE INVENTION

Field of the Invention

The present invention relates to the automated classification of invoices that do not have an associated purchase order, and the electronic routing of such invoices for approval in an organization.

Description of Related Art

All invoices processed by an organization are classified by one or more general ledger account codes. This account coding determines where on the organization's profit and loss statement or balance sheet the expense will appear. For example, an invoice from a utility provider may be coded to electric costs for a specific office location. This helps organizations understand their costs in specific areas of expense, entities, locations, departments, or other classifications. When invoices are misclassified, organizations will have a poor picture of their expenses. For example, if the electric invoice is coded improperly to rent, the organization will think that their electric costs decreased and their rent costs increased. In another example, the invoice may be properly coded to rent but to the wrong office. This will potentially lead to poor decision making by organization managers.

While account coding may seem straightforward, in medium-sized and large organizations it can be very complex. These organizations typically have a large chart of accounts. The chart of accounts is a listing of all of the account codes used by the organization, which may include the natural accounts (accounts used to classify the nature of the expense such as the electric costs in the example above) and other accounts (known as segments) such as department, location, financial entity, cost center, project, and so on. When an invoice is coded it generally appears as XXXXX-XXX-XXXX-XX, where each segment is of a certain length; this string of values is known as a distribution line, and invoices may have one or more distribution lines. Each one of these account codes may be from a very long list; a midsize organization often has 500 to 1,000 natural accounts. Because of their complexity, very large organizations may use 10 or more different segments.

On top of this, not all combinations of segments are valid. For example, if an organization uses a segment for department, an electric bill may only be validly coded to electric costs and the facilities department but not the marketing department. Few accounting systems validate the combination of account codes, which is another problem. In a very large organization that has 10 account segments, 3,628,800 combinations of segments are possible, but only several hundred thousand may be valid.

Invoices received by organizations can be categorized by invoices that have an associated purchase order and those that do not. Invoices that have a purchase order inherit the account coding from the purchase order itself. This is entered into the accounting system by the person who creates the purchase order. However, invoices that do not have a purchase order are generally coded manually by the approver(s) of that invoice, often leading to errors. In fact, 15% or more of all invoices have coding errors, leading to inaccurate profit and loss and balance sheet statements and poor management decision-making. Additionally, it takes valuable time for managers to identify the correct coding. The present invention particularly addresses this aspect of the deficiencies in the prior art.

The manual coding of invoices is difficult for invoice approvers because they are not accountants and do not necessarily know the correct coding for specific invoices. They often guess based on the name of the account code and rarely receive any training on how to code invoices. It is also common for an invoice approver to code the same invoice in different ways because they cannot remember how they coded it the last time. And a manager in one location often codes the invoices differently than a manager in another location, so one location may show a higher level of expense (and of course a lower level of expense in a different area) than the other. And it is extremely difficult for them to know what combinations of account codes are valid since these are often not published and take too much time to refer to even if they are available.

Heretofore, prior art in this area has been almost entirely focused on account coding for individuals doing their own accounting or for small businesses where coding is performed by bookkeepers, which is much simpler. In a home environment or small business, the electric bill is coded to utilities or electric costs, the telephone bill is coded to telephone, etc. There is often only one segment (which is known as a natural account) and the list of accounts is small. The prior art has been developed so home accounting systems such as Quicken or small business systems such as QuickBooks can attempt to automatically code the invoice from AT&T to the Telephone account. This prior art has focused on classification of invoices across companies; assuming that all companies have a telephone account, the prior art has focused on coding AT&T invoices to the Telephone account.

Due to the far greater complexity and unique charts of accounts in mid-sized and larger organizations, no prior attempts have been made to invent a system to automatically code invoices for organizations across all of the needed segments. The prior art that was focused on organizations solely attempted to identify the natural accounts for certain transactions based on how the same transaction had been coded in the past and/or by a specific person or by another smaller company or individual. This is far too simplistic, however, to handle common conditions in larger organizations where an invoice must be coded to multiple, unique segments or where it can be coded differently in one or more segments outside of the natural account based on some of the contents of that particular invoice.

More and more, organizations are sending invoices electronically as data files to reduce the manual effort of hand keying invoice information into an accounting system. However, these invoices are almost always coded manually, which defeats the purpose of an electronic transaction in the first place. Keying is easy and takes little time, but proper coding is difficult and takes much more time. In addition, organizations that do receive electronic files of invoice information often do not route them for approval because they have no mechanism for doing so electronically and do not want to have to print them out and route them for approval manually, which defeats the purpose of receiving the invoice electronically in the first place. These organizations instead rely on a "negative approval", which allows managers to question any figures on their departmental profit and loss statement. This is dangerous because it assumes that the invoices are correct, when suppliers often send invoices with many errors and these are very difficult to spot when reviewing a profit and loss statement unless the error is quite large.

Therefore, a system is needed that independently and properly codes invoices to all segments in each organization's unique chart of accounts and routes them electronically for approval throughout said organization.

SUMMARY OF THE INVENTION

The present invention is directed to an invoice processing system (herein referred to as the Invoice Classification and Approval System) that comprises a server-based (e.g., local or network server-based) software implemented process, which facilitates processing invoices (e.g., classification/coding of invoices and approval of invoices). The problems listed above with the prior art have been solved with the inventive Invoice Classification and Approval System.

In one aspect of the present invention, a method and system are provided for managing and automating the classification of non-purchase order invoices for organizations. A centralized server applies rules to properly apply general ledger account coding for invoices based on data contained in the invoice. In a further aspect of the present invention, the server is configured to electronically routes the properly classified invoice for approval to the appropriate approvers in the organization. In the absence of rules, the system applies machine learning to learn the correct rules, to be applied the next time said invoice is received and processed.

In another aspect of the present invention, the Invoice Classification and Approval System is fundamentally comprised of two software applications: an automated coding module and an electronic routing and approval module, residing on a local server or on a remote server accessed over a network (e.g., the Internet). In one embodiment, the Invoice Classification and Approval System of the present invention comprises a remote server communicating with remote user accounting systems over a network.

In one embodiment, the automated coding module determines general ledger coding based on two main inputs: invoice index data and a coding matrix. When an invoice comes into the system, it contains basic header information such as vendor, invoice number, invoice date, total amount, and document type (invoice, credit memo, etc.). This header information may be from an electronic file of some sort or may be indexed from a paper invoice through hand entry by an accounts payable clerk (known as a processor) or an optical character recognition (OCR) system; either way it is the same data that has to be processed.

In one embodiment, the coding matrix is determined using rules supplied by the organization, or learned by the system, or a combination of both. The system utilizes data on the invoice to lookup a series of rules in the coding matrix to properly apply the coding to that invoice. The data on an invoice is generally classified into header and line items. In one embodiment (see, e.g., FIG. 9.1), the header information may consist of the vendor, invoice date, invoice number, and invoice amount (e.g., labeled as "Balance Due"). The body of the invoice has the line items, which generally have a quantity, description, unit price (e.g., labeled as "rate"), and amount. In some cases, coding may need to be determined based on information on the invoice that is not in the header or in the line items, in which case the system uses further rules to determine the correct coding or the invoice is electronically routed to a processor who is asked a series of queries to determine the proper coding based on the coding matrix. If a rule doesn't exist for the data input, it is routed to a processor to be coded manually.

In one embodiment, once the invoice has been coded, it is electronically routed for approval within an organization to approvers based on a predetermined approval matrix. This matrix has two main approval matrices: one by location in the case where an organization has multiple locations with managers that approve invoices based on set approval levels, such as a restaurant or chain of retail stores, and one for non-location-specific invoices such as those approved by managers at the organization's headquarters office. If the invoice is for a specific location, it will be routed based on the location approval matrix, otherwise routing will be based on the general approval matrix. Electronically routing documents for electronic approval is known in the art, however a matrix that allows for both the coding of invoices across all segments of the chart of accounts and the complexity of approval matrices for larger organizations is not known and is part of the present invention.

In a further embodiment, the system has the ability to learn based on approvers' coding and manual routing while utilizing the system. If an approver codes an invoice in a specific way, the system asks a series of queries to determine whether similar invoices should be coded this way in the future and the invoice is optionally is routed to an accountant within the organization to approve such coding. Similarly, if an approver routes an invoice, the system will learn the routing and route the invoice according to that routing the next time it is in the inbox of the approver. In an embodiment, the system also uses machine learning to determine if the coding or approval routing is valid.

In another embodiment of the present invention, the inventive system's functions may be centralized on the remote server, with complementary invoice processing/handling related functions (e.g., in user or client devices) in network communication with the remote server via the network. Electronic data relating to the invoices may also be stored in a centralized database associated with the inventive system.

As used throughout herein, "centralized" refers to the processing and management of data and/or more critical activities and/or components at a centrally managed device or a group of devices in a single location or a cluster of distributed locations that are logically linked (collectively, a "remote server"). "User" refers to an individual, an organization (e.g., a business entity, a legal entity, etc.) or its representative, which utilize the inventive system to process invoices (hereinafter, "user" and "organization" may be referenced interchangeably, with references to "organization" also apply to "user", or vice versa, as appropriate to the context of discussions hereinbelow).

In one aspect, the present invention comprises various combinations of features outlined below and set forth in the claims.

An invoice processing system that manages invoices from a plurality of vendors, comprising: a server managing a matrix of coding rules across a plurality of segments of chart of accounts for a plurality of vendors, wherein each of the segments has two or more possible values; a database associated with the server storing the matrix of coding rules; wherein the server is configured to, upon receiving particular vendor information for a particular invoice to be processed and a request to provide the appropriate coding and other values, derive the appropriate coding values from the matrix of coding rules for the particular vendor across all of the segments of the chart of accounts for the particular invoice, including other values independent of the chart of accounts, and to return said request.

The coding matrix may comprise a percentage and/or numeric allocation of the total amount of the particular invoice across multiple distribution lines for all of the segments of the chart of accounts for the particular invoice; one distribution line containing one set of values across all of the segments of the chart of accounts for the particular invoice, coding values in one or more segments of the chart of accounts that vary depending on any information contained on the invoice including the location on the invoice where goods were delivered or services performed; or for the one distribution line containing one set of values across all of the segments of the chart of accounts for that particular invoice. Alternatively, the coding matrix comprises one or more queries about data on the particular invoice for the particular vendor, and the server is configured to either retrieve data from the invoice via OCR or electronic form to answer said queries, or display said query to a system user designated as a processor as needed, and the server is further configured to perform at least one of the following actions: (a) upon receiving a Yes or No answer to each query, the server derives and returns the coding values in the matrix for one or more sets of values across all of the segments of the chart of accounts for the particular invoice; (b) upon receiving a No answer, the server triggers display of an additional query about data on the particular invoice for the vendor; and (c) perform a calculation using the values entered to assign coding values and amounts to one or more distribution lines for one or more sets of values across all of the segments of the chart of accounts for the particular invoice. In another embodiment, the coding matrix may comprise at least one of: (a) an alphanumeric description of the expense for the particular invoice; (b) a service delivery starting and/or ending date that the system will combine with the alphanumeric description of the expense for the particular invoice; (c) a document type value for the particular invoice; and (d) a formula that the system uses to calculate and replace the value of any other header or detail line item field for the particular invoice.

In one embodiment, the server is configured to import the chart of accounts from an accounting system, and provide a system user designated as an accountant with a series of web pages to define and store in the database the segments of the chart of accounts. The server may be further configured to import vendor information from the accounting system (including vendor name and/or vendor ID), and provide the accountant with a series of web pages to define and store in the database a list of vendor categories, wherein each vendor is assigned by the system user with a vendor category. The server provides the accountant with a series of web pages to define and store in the database, comprising: valid columns in the coding matrix; valid queries and query answers by vendor; coding rules for each and all segments in the chart of accounts for each vendor for each unique combination of vendor and query; additional columns in the coding matrix where the server will associate additional data in the database in said columns; and valid combinations of segments in the chart of accounts in the coding matrix.

In an alternate embodiment, the server is configured to provide accountant with a series of web pages to further define an approval path for each vendor, including zero-level approvers and multiple approvers at the same approval level, further defining the approver roles, names and approval limits by approval level and stores said data in the database. The server may be further configured to provide the accountant to define an approval matrix by location, including zero-level approvers and multiple approvers at the same approval level, further defining the approver roles, names and approval limits by approval level and stores said data in a database. The server may be further configured to automatically route an invoice if the particular vendor does not have coding rules in the coding matrix, and to (a) ask a system user designated as a processor or the accountant a series of queries to define the correct coding rules across all segments of the chart of accounts including any other fields and stores the coding rules the database, and (b) utilize machine learning using data from the organization as well as coding rules from other organizations to define the correct coding rules across all segments of the chart of accounts including any other fields and stores the coding rules in the database.

In a further embodiment, the server may be configured to utilize machine learning using data input from a system user to define an approval path for each vendor and an approval matrix by location, including zero-level approvers and multiple approvers at the same approval level, further defining the approver roles, names and approval limits by approval level and stores said data in the database. The server may be configured to automatically and successively route a coded invoice to at least one system user designated as an approver identified in the approval matrix, display the invoice image with coding from the coding matrix if available, allows the approver to change the coding as needed, asks the approver to approve or reject the invoice, and stores coding changes and the results of approvals and rejections in the database. If a system user designated as an approver changed the coding on an invoice, the server may be configured to ask the approver a series of queries to determine if updated coding rules are required, including whether the coding charge is one-time or permanent and what information on the invoice suggested a change in the coding rules, and store the suggested changes to the coding rules in the database. If the approver of the invoice changed the coding, the server is configured to route the invoice to a system user designated as an accountant to validate updated coding rules from an approver, whereby the accountant either rejects the new coding rule or creates and new one, either of which are stored in the database. The server can be further configured to send a notification to the approver if said approver changed the coding and the accountant rejected the coding change by the approver.

In another embodiment, the server is configured to automatically route an invoice to the accountant wherein the approver changed the routing path, and the accountant either approves the change in routing path and further defines the conditions where the routing rule is performed, or rejects the change in routing path, and the database stores any changes to the routing path in the approval matrix in the database. The server may be configured to send a notification to the approver if said approver changes the routing path and the system user designated as an accountant rejected the routing path change by the system user designated as an approver.

In one embodiment, the server is configured to use fuzzy logic to determine the correct approver where the name of the approver is on the invoice and is used to determine the first approver in a routing path. The server can also be configured to provide a system user designated as a system administrator with a series of web pages to define data extract parameters for each vendor including data extract methods, fields and related characteristics, formats, frequencies and transmission types, all of which are stored in a database, and wherein the server is configured to automatically or upon request, extract data from the database based on the defined data extract parameters and transmits said data to another system.

In another embodiment, a process of managing invoices from a plurality of vendors, comprises process implementations of various combinations of features outlined above.

BRIEF DESCRIPTION OF THE DRAWINGS

For a fuller understanding of the scope and nature of the invention, reference should be made to the following detailed description read in conjunction with the accompanying drawings that depict system modules, functionality and processes.

FIG. 3.1 is an illustration of a sample account coding matrix utilized by the system to automatically code invoices with the correct account coding across all of the segments of the chart of accounts, in accordance with one embodiment of the present invention.

FIG. 4.1 is an illustration of a sample overall approval matrix utilized by the system to automatically route invoices for approval to the correct person(s) in an organization, in accordance with one embodiment of the present invention.

FIG. 4.2 is an illustration of a sample location-based sub-segment of the approval matrix utilized by the system to automatically route invoices for approval to the correct person(s) in an organization, in accordance with one embodiment of the present invention.

FIG. 6.1 is a diagram depicting the queries answered by a processor (or an accountant) within a client organization to define the coding rules for an invoice that has not been coded before, in accordance with one embodiment of the present invention. The system then creates coding rules for this invoice that will be automatically applied the next time an invoice from that vendor is entered into the system.

FIG. 6.2 is a diagram depicting the queries answered by an invoice approver within a client organization if they changed the coding on an invoice, in accordance with one embodiment of the present invention. The system will use machine learning based on these answers to determine if a new or modified coding rule needs to be created for this particular vendor's invoice. It also includes an option whereby the invoice is routed to a processor (or accountant) within the client organization to review and approve any new coding rules.

FIG. 6.3 is a diagram depicting the queries answered by a processor (or accountant) within a client organization when in FIG. 6.2 an approver changes the coding on an invoice and an option is set whereby a processor (or accountant) is required to review and approve the new coding rules, in accordance with one embodiment of the present invention.

FIG. 7.1 is a diagram depicting the steps required to define the data extract parameters for the automated data extraction defined in FIG. 7, in accordance with one embodiment of the present invention.

FIG. 9.1 through 9.6 are sample invoices referenced in this description of the invention and examples herein.

DETAILED DESCRIPTION OF EMBODIMENTS OF THE INVENTION

Figure 1:
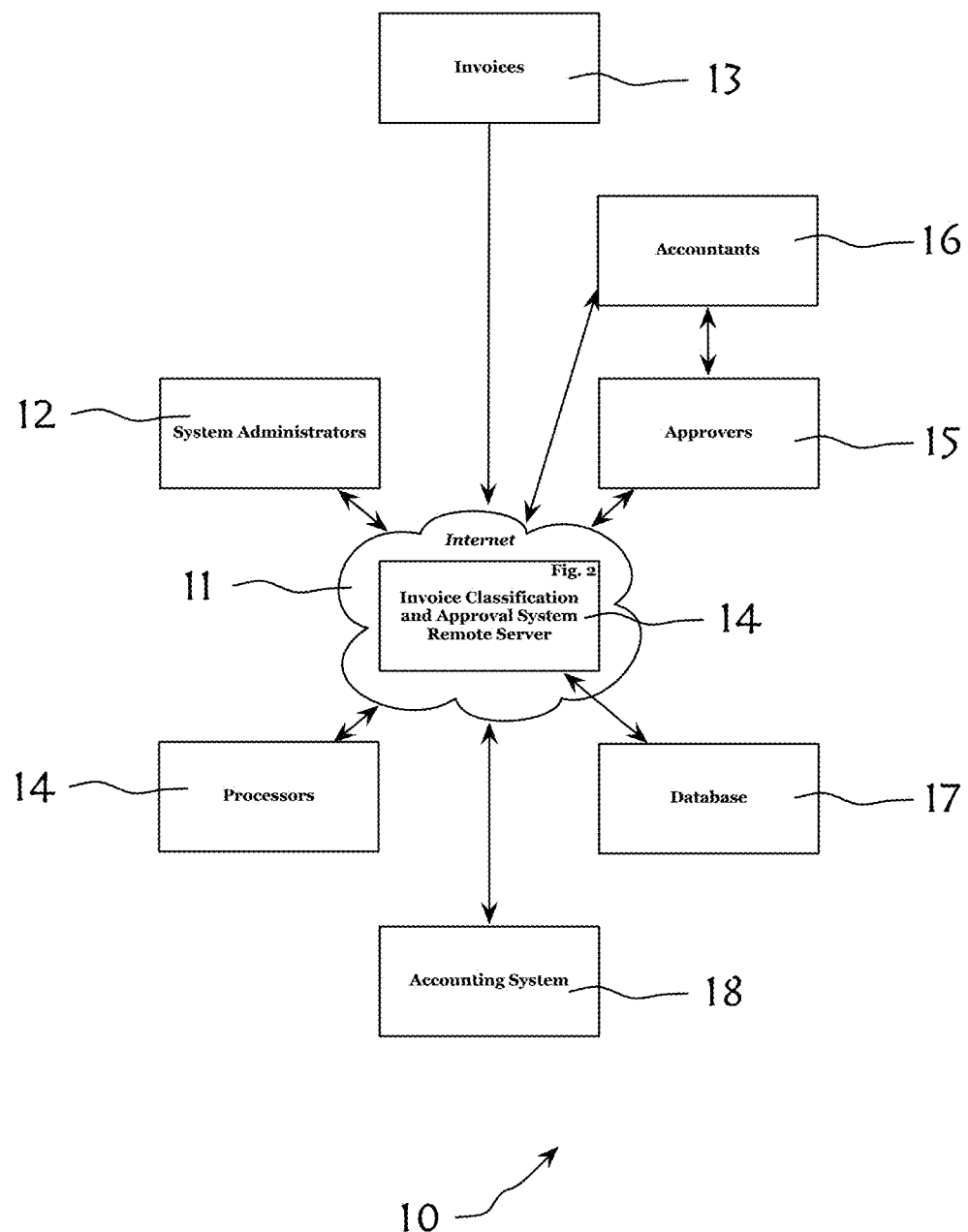
FIG. 1 is a high-level system diagram depicting the Invoice Classification and Approval System, in accordance with one embodiment of the present invention.

The present description is of the best presently contemplated mode of carrying out the invention. This description is made for the purpose of illustrating the general principles of the invention and should not be taken in a limiting sense. The scope of the invention is best determined by reference to the appended claims.

The detailed descriptions of the Invoice Classification and Approval System and process of the present invention are presented in terms of schematics, functional components, methods or processes, symbolic or schematic representations of operations, functionalities, and features of the invention. These descriptions and representations are the means used by those skilled in the art to most effectively convey the substance of their work to others skilled in the art. A software-implemented function, method, or process is here, and generally, conceived to be a self-consistent sequence of steps leading to a desired result. These steps require physical manipulations of physical quantities. Often, but not necessarily, these quantities take the form of electrical or magnetic signals capable of being stored, transferred, combined, compared, and otherwise manipulated by associated hardware, software, and firmware.

Useful devices for performing the software-implemented processes, operations, and functions of the present invention include, but are not limited to, general or specific-purpose digital processing and/or computing devices, which devices may be standalone devices or part of a larger system; portable, handheld, or fixed in location. Different types of client and server devices can be configured to implement the electronic applications of the present invention. For example, the web pages to set up the system by system users of the present invention may be accessed using different types of client computing devices. The invention is operational with numerous other general purpose or special purpose computing system environments or configurations. Examples of well-known computing systems, environments, and/or configurations that may be suitable for use with the invention include, but are not limited to, personal computers, server computers, handheld or laptop devices, multiprocessor systems, microprocessor-based systems, set-top boxes, programmable consumer electronics, network PCs, minicomputers, mainframe computers, embedded systems, distributed computing environments that include any of the above systems or devices, and the like. For example, portable computing devices may include notebook computers, netbook computers, tablet devices, etc., and handheld devices may include smart phones, PDAs (personal digital assistants), etc.

These devices may be selectively activated or configured by a program, routine and/or a sequence of instructions and/or logic stored in the devices to execute the disclosed functions, processes, and operations. In short, use of the processes, functions, and operations described and suggested herein is not limited to a particular processing configuration.

For purposes of illustrating the principles of the present invention and not by limitation, the present invention is described herein below by reference to an exemplary system. However, it is understood that the present invention is equally applicable to systems of other configurations embodying the invention, without departing from the scope and spirit of the present invention.

System Overview

The Invoice Classification and Approval System is comprised of a local server-based or cloud-based (e.g., the internet) software-implemented process (e.g., a network-based application service) that is designed to provide its users with access to a unified system and process of managing invoice coding and approval routing data including the creation, storage, and update of said data. The Invoice Classification and Approval System is fundamentally comprised of two software applications: an automated coding module and an electronic routing and approval module, which may reside on a local server or on a remote server accessed over a network (e.g., the Internet).

In one aspect, the Invoice Classification and Approval System may be comprised of an Invoice Classification and Approval System remote server in local network or cloud-based communication with web pages (otherwise known as a browser-based user interface, whether local or cloud-based) used by system administrators to set up and maintain the system, invoices submitted into the system, processors that process invoices including defining invoice coding, invoice approvers that approve invoices including optionally modifying coding on invoices, accountants that review and validate both invoice coding and approval routing, a database associated with the remote server that stores the invoice data, coding rules and approval routing rules, and external accounting system(s) which optionally receive data transmitted by the system.

The Invoice Classification and Approval System allows anyone, including non-code programmers, to define invoice coding rules across all segments of an organization's chart of accounts and define approval routing rules; deploy a database to store the invoice data and all associated coding and routing rules; and specify data file format, field transformations, and file transmission methods to allow the software to create and send an electronic file containing the invoice data into an external accounting system. The system allows an organization to send files containing invoice data or manually enter an invoice into the system whereby the system will, based on the rules previously defined, automatically code the invoice across all segments of the chart of accounts specific to that organization and route it electronically for approval through all approvers within the organization, learn both revised coding rules if an approver changes the coding on an invoice and learn revised routing paths if an approver revises the approval path, validate said rules, store the invoice including its data in a database on the remote server, and then send it to an external accounting system to eliminate data entry of the invoice data into the accounting system. In this way, it removes much of the work of processing invoices while significantly improving overall process quality.

Computing Environment Including Information Exchange Network

The Invoice Classification and Approval System in accordance with the present invention may involve, without limitation, distributed information exchange networks, such as public and private computer networks (e.g., Internet, Intranet, WAN, LAN, etc.), value-added networks, communications networks (e.g., wired or wireless networks), broadcast networks, and a homogeneous or heterogeneous combination of such networks. As will be appreciated by those skilled in the art, the networks include both hardware and software and can be viewed as either, or both, according to which description is most helpful for a particular purpose. For example, the network can be described as a set of hardware nodes that can be interconnected by a communications facility, as the communications facility itself, or as the communications facility itself with or without the nodes. It will be further appreciated that the line between hardware and software is not always sharp, it being understood by those skilled in the art that such networks and communications facility involve both software and hardware aspects.

The Internet is an example of an information exchange network including a computer network in which the present invention may be implemented. Many servers are connected to many clients (which may be desktop, portable, and/or handheld devices) via the Internet network, which is comprised of a large number of connected information networks that act as a coordinated whole. Details of various hardware and software components that make up the Internet network (such as servers, routers, gateways, etc.) are well known in the art. Access to the Internet by the servers and clients may be via suitable transmission media, such as Ethernet, satellite, telephone wires, wireless RF links, Wi-Fi, Bluetooth, or the like; and user interface tools, such as browsers, implemented therein. Communication between the servers and the clients takes place by means of an established protocol. As will be noted below, the Invoice Classification and Approval System of the present invention may be configured in, or as one or more of, the servers, and be accessible by a user via one or more of the clients.

Figure 8:
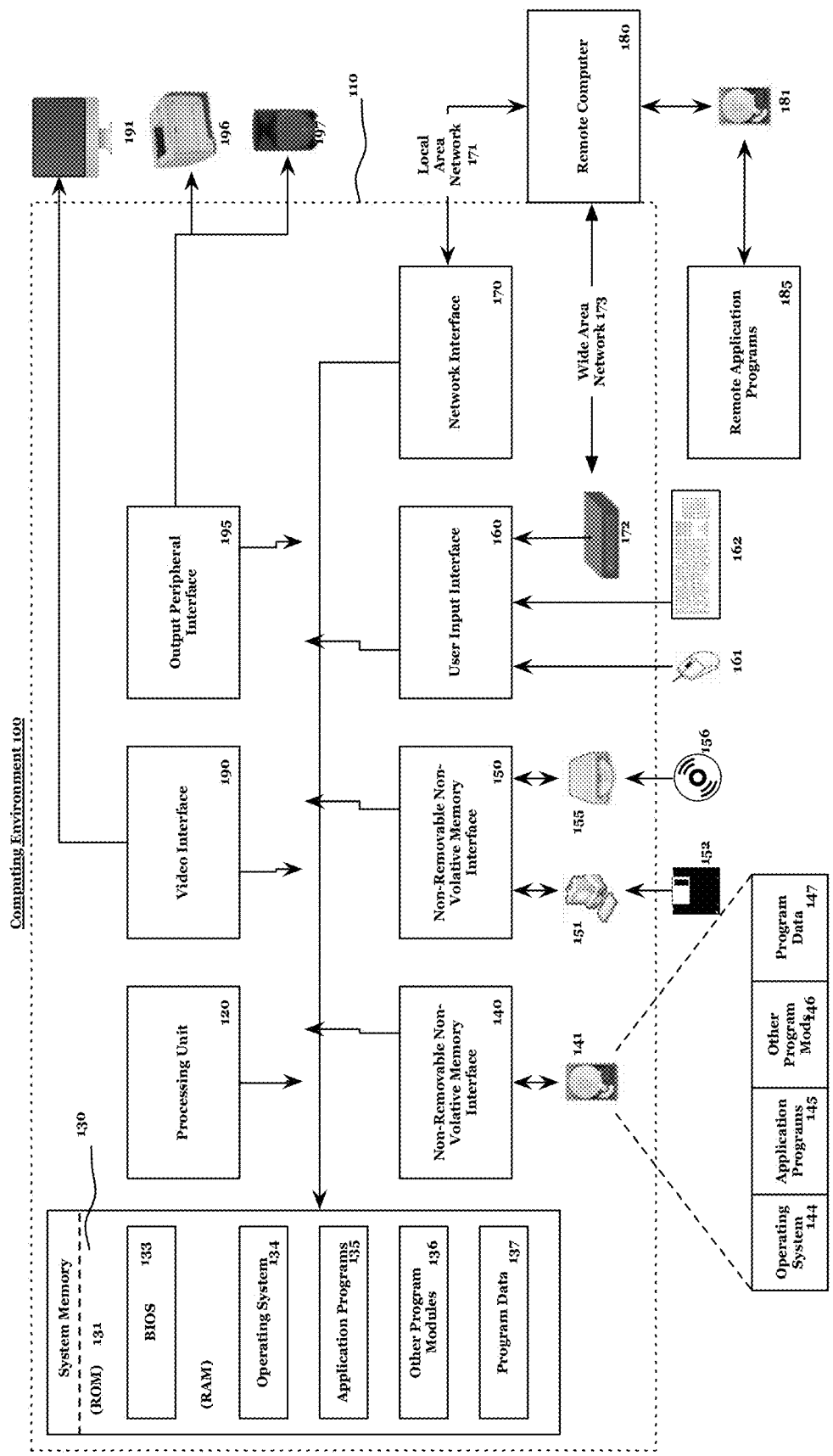
FIG. 8 is a schematic diagram of an exemplary computing environment in which aspects of the invention may be implemented, in accordance with one embodiment of the present invention.

FIG. 8 shows an exemplary computing environment 100 in which aspects of the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention may be described in the general context of computer-executable instructions, such as program modules, being executed by a computer. Generally, program modules include routines, programs, objects, components, data structures, etc. that perform particular tasks or implement particular abstract data types, including the networked-based (e.g., cloud-based) application of the Invoice Classification and Approval System and process described herein below. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 8, an exemplary system for implementing the invention includes a general-purpose computing device in the form of a computer 110 (which is exemplary of the components adopted by servers and/or clients). Components of computer 110 may include, but are not limited to, a processing unit 120, a system memory 130, and a system bus 121 that couples various system components including the system memory to the processing unit 120. The processing unit 120 may represent multiple logical processing units such as those supported on a multi-threaded processor. The system bus 121 may also be implemented as a point-to-point connection, switching fabric, or the like among the communicating devices.

Computer 110 typically includes a variety of computer-readable media. Computer-readable media can be any available media that can be accessed by computer 110 and includes both volatile and non-volatile media, removable and non-removable media. Communication media typically embodies computer-readable instructions, data structures, program modules, or other data in a modulated data signal (i.e., a signal that has one or more of its characteristics set or changed in such a manner as to encode information in the signal) such as a carrier wave or other transport mechanism, and includes any information delivery media. By way of example, and not limitation, communication media includes wired media such as a wired network or direct-wired connection, and wireless media such as acoustic, RF, infrared, and other wireless media. Combinations of any of the above should also be included within the scope of computer readable media.

The system memory 130 includes computer storage media in the form of volatile and/or non-volatile memory such as read-only memory (ROM) 131 and random-access memory (RAM) 132. A basic input/output system 133 (BIOS), containing the basic routines that help to transfer information between elements within the computer 110, such as during start-up, is typically stored in ROM 131. RAM 132 typically contains data and/or program modules that are immediately accessible to and/or are presently being operated on by processing unit 120. By way of example, and not limitation, FIG. 8 illustrates operating system 134, application programs 135, other program modules 136, and program data 137.

The computer 110 may also include other removable/non-removable, volatile/non-volatile computer storage media. By way of example only, FIG. 8 illustrates a hard disk drive 141, a magnetic disk drive 151 that reads/writes a removable magnetic disk 152, and an optical disk drive 155 that reads/writes a removable optical disk 156, such as a CD ROM or other optical media. The hard-disk drive 141 is typically connected to the system bus 121 through a non-removable memory interface such as interface 140, and a magnetic disk drive 151 and optical disk drive 155 are typically connected to the system bus 121 by a removable memory interface, such as interface 150.

The drives and their associated computer storage media discussed above and illustrated in FIG. 8 provide storage of computer-readable instructions, data structures, program modules, and other data for the computer 110. In FIG. 8, for example, a hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball, or touch pad. Other input devices (not shown) may include a microphone, joystick, satellite dish, scanner, or the like. These and other input devices are often connected to the processing unit 120 through a user input interface 160 that is coupled to the system bus but may be connected by other interface and bus structures such as a parallel port, game port, or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device, or other common network node, and typically includes many or all of the elements described above relative to the computer 110, although only a memory storage device 181 has been illustrated in FIG. 8. The logical connections depicted in FIG. 8 include a local area network (LAN) 171 and a wide area network (WAN) 173 but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules accessible by the computer 110, or portions thereof, may be stored in the remote memory storage device 181. By way of example, and not limitation, FIG. 8 illustrates remote application programs 185 as residing on memory storage device 181 associated with the remote computer 180. It will be appreciated that the network connections shown are exemplary and other means of establishing a communications link between the computers may be used.

In the below disclosed embodiment of the present invention, the Invoice Classification and Approval System of the present invention may be implemented in a network-based application represented by the remote application programs 185 residing in the memory storage device 181, which is accessed by the computer 110 and executed via the remote computer 180, within the environment shown in FIG. 8. In other words, the remote computer 180 undertakes the functions of a server, and the computer 110 undertakes the role of a client, in reference to the network environment shown in FIG. 8.

This invention works in conjunction with existing technologies, which are not detailed here, as they are well known in the art and to avoid obscuring the present invention. Specifically, methods currently exist involving the Internet, cloud-based tools and communication, and related methods and protocols.

Explanation of Account Coding

Before the Invoice Classification and Approval System is described, it is best to explain the account coding structure of invoices in small versus mid-sized to large organizations. All organizations have defined in their accounting systems what is called the Chart of Accounts. The chart of accounts is a listing of all accounts used in the general ledger of an organization. The chart of accounts is used by the accounting software to aggregate information into an entity's financial statements. The chart of accounts is usually sorted in order by account number, to ease the task of locating specific accounts. The accounts are usually numeric but can also be alphabetic or alphanumeric. The chart of accounts defines the accounts that appear on the income statement or the balance sheet of an organization's financial statements.

In small organizations, coding is simple. Invoices are coded to what is called a natural account. The natural account is the most fundamental element of the account code structure. This element represents the primary purpose of the account (e.g., marketing expense or telephone expense). In a small organization, the phone invoice is coded to telephone, which is easy. The prior art has focused its attention solely on how to code the natural account for individuals and small businesses.

However, in mid-sized to large organizations the coding is more complex, with a series of account code segments. These segments and the values of each segment are unique to each organization. For example, an organization might have four segments in the chart of accounts: a natural account, a location/department, a cost center, and an entity/company. These may appear as 12345-123-1234-12, with a dash representing a delimiter between each segment. To code the invoice, all four segments are mandatory. Invoice approvers coding invoices manually often make coding mistakes, so automation and proper coding is important both from a time-saving and accuracy perspective. In addition, not all combinations of coding segments are valid; for example, marketing expenses generally are a corporate expense and cannot be coded to a particular office location. As a result, the complexity level for mid-sized to large organizations is orders of magnitude greater than in a small organization. Throughout the description of this invention, the word "coding" refers to coding across all segments of the chart of accounts, not simply the natural account. Invoices may be coded to one string of accounts, known as a distribution line, or more than one distribution lines. For example, an invoice might be allocated 50% to the Los Angeles office and 50% to the San Francisco office by using two distribution lines where the segment that identifies the office is changed and half of the total amount is entered for each distribution line.

Similarly, approval routing can be complex as well. In most organizations, the approver of an invoice is determined by the name on the invoice (e.g., Attention: Jim Smith). In a smaller company, it is known that the marketing person codes the invoices from the marketing vendors and so on. However, in a larger company where people do not necessarily know each other, especially in geographically remote offices, determining who approves what invoice can be very challenging. Accounting departments often spend copious time determining who should approve an invoice.

The present invention solves these issues through a series of matrices and business rules executed by a system. The Invoice Classification and Approval System is fundamentally comprised of two software applications: an automated coding module and an electronic routing and approval module. These modules can either be cloud-based, such as an application service that is standalone or is connected to or embedded in another cloud-based workflow system, embedded in an accounting system, on a server on a local network, or a hybrid of any of these. Therefore, in an embodiment, it can be installed on the server that houses the accounting system used by an organization (in the case of a cloud-based accounting system, it is integrated into the cloud-based application service) or it can be entirely cloud-based and integrate with the accounting system whether it is on a local server or is itself cloud-based. The cloud-based application service is resident on remote servers accessed over the internet.

Remote Server

Figure 2:
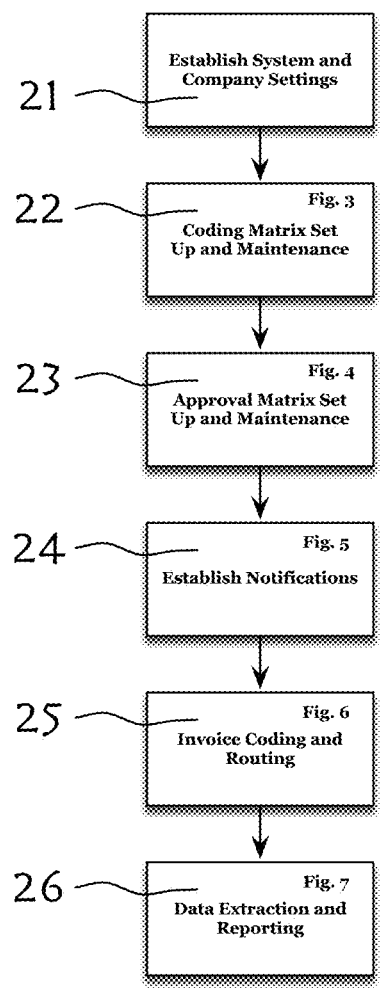
FIG. 2 is a diagram depicting the key functionality of the system and all of its modules, in accordance with one embodiment of the present invention.

The "center" of the Invoice Coding and Approval System 10 is the remote server 14, which manages the entire system 10. FIG. 2 schematically illustrates the functional blocks comprising the remote server 14. Each functional block will be separately discussed below in reference to sub-level figures.

At block 21, each user organization using the system establishes their organization-specific information on the remote server 14 including information such as, but not limited to, their organization name and physical address, company logo (through an upload of a graphic file), and email address domain name by manually entering data or uploading files containing that information into a series of web pages on the remote server 14. In addition, the system allows for signup of individual system users on the remote server 14 that can either approve invoices (approvers) or act as processors or accountants, including the definition of their role within the organization, for example, the manager of the Tacoma, Washington office. Personnel that can approve invoices can be anyone in the organization that has the authority to approve spending and/or receipt of goods or services. Processors are users that process invoices, typically by entering them (either through manual input through a series of forms, data uploads or through an OCR process) into the system and resolving any issues associated with them. In most organizations this is the function of the accounts payable clerk. Accountants are more senior staff in the accounting department that have the knowledge to set or verify both the correct account coding and approval paths for invoices. These are often staff accountants.

Once the basics of the system are set up on the remote server 14, additional work needs to be performed to get the system ready for automated coding and approval routing. Block 22 is where a system user designated as an accountant (typically an accountant with knowledge of how invoices are coded within the organization) can set up the coding matrix on the remote server 14. Block 23 is where a system user designated as an accountant (again, typically an accountant with knowledge of how invoices are routed for approval within the organization) can set up the approval matrix on the remote server 14. The system administrator can also set up how they want the system to notify users of specific activities on the remote server 14 in Block 24.

Heretofore, an invoice is generally coded manually by an individual invoice approver when they either receive it on paper directly from a vendor or when it is routed to them for approval in a manual or electronic approval routing path or, if the invoice is received centrally by the accounts payable department, it is sometimes coded by the accounts payable clerk before it is routed for approval either on paper or electronically. In a manual approval path, as the paper invoice is manually routed from the first approver through each successive approver, each approver either writes (what they believe is) the proper account coding on the invoice or changes the coding (if they think it is incorrect) and then sends it on to the next approver. An electronic process is handled the same way. Generally, each approver knows who is next in the approval path, which is generally their immediate supervisor.

Since the internet has thoroughly penetrated society and cloud-based technologies have gained a sufficient level of sophistication, the present invention can take advantage of these technologies to utilize a centralized, rules-based, remotely executed, vendor-specific approach rather than the decentralized, anonymous, manual coding, manual routing approach utilized by paper and existing electronic invoice processing systems.

Block 25 is where the system on the remote server 14 allows for entry of new invoices into the system and executes automated coding and routing of invoices for approval based on the rules established previously, including learning modules that let the system learn correct coding and routing rules if invoice approvers add or change coding and routing for individual invoices. Once the invoice has been coded and approved on the remote server 14, the system will then extract the data on the remote server 14 based on data extraction rules set up in Block 26 and send it to the accounting system for uploading to eliminate any superfluous data entry.

Coding Matrix Set Up and Maintenance

Figure 3:
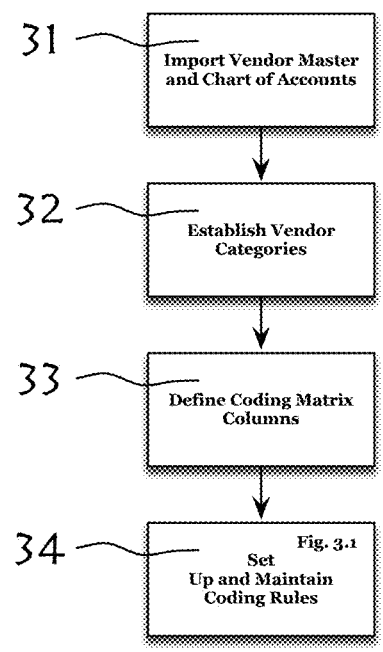
FIG. 3 is a diagram depicting the steps required to set up and maintain the account coding rules, in accordance with one embodiment of the present invention.

FIG. 3 depicts how the system on the remote server 14 allows a system user to set up the coding matrix. The appropriate system user (generally a system user designated as an accountant) is walked through a series of web pages to assist them in easily establishing the coding matrix. The first step in Block 31 is to import the vendor master and chart of accounts from the accounting system. The vendor master is a list of all of the vendors from which the organization currently buys goods and services. Most accounting systems allow users to easily download such a list into a spreadsheet and this is what can be uploaded into the system on the remote server 14 through a designated web page. The vendor master is one of the key building blocks of the coding and approval matrices, as both coding and approval routing starts with identification of the vendor on the invoice.

Since the system will automate invoice coding, the chart of accounts needs to be defined and loaded onto the remote server 14 as well. Using a series of web pages, the user can define the various segments of the charts of accounts. This involves entering the name of each segment and the type (numeric, alphanumeric) and length of each segment. The system will then provide the user with a spreadsheet that the chart of accounts can be pasted onto (from an extract from the accounting system), segment by segment, listing the name, short and long description of each value. In an embodiment, another tab can hold the valid combinations of the segments, which can again be pasted. When the spreadsheet is complete, the user can upload it onto a web page on the remote server 14 to complete the chart of accounts setup.

Coding in an organization is generally similar by type of expense, and vendors generally fall into select types of expenses which the system refers to as Vendor Categories. A vendor category may be a broad or a narrow definition and will often vary widely in different organizations. Sample vendor categories are general offices expenses, human resources, information technology, or legal expenses. In a manufacturing organization, there may be vendor categories for specific types of raw materials such as screws and bolts, sheet metal, temporary labor, etc. The system asks the user to organize each vendor into a vendor category because it helps the user determine the correct coding and approval routing. For example, human resources expenses will generally be coded to the human resources department and a common set of natural accounts, and will follow an approval path through the various approvers in the hierarchy of the human resources department. When the coding matrix is laid out on the web page on the remote server 14, a natural grouping helps the user ensure that the coding and approval routing is accurate. In Block 32, the system lets system users (typically a system user designated as an accountant) define the appropriate vendor categories for the organization. This is simply a list at this point but can of course be updated over time. A web page enables the system user to do just that.

The coding matrix is fundamentally built by vendor and vendor category. The vendor category classifies which type of vendor it is; for example, a certain vendor might be a utility vendor and certain rules may apply to utility vendors in terms of coding and approval routing. The vendor is known because it was captured when the invoice was indexed by the system previously. In its simplest form, the coding matrix has data that allows the system to automatically code the invoice based on the invoice information captured. For example, the matrix knows that Joe's Catering is only used by the St. Louis office and it never varies and so is always coded to 70161-451-4513-310, where 70161 is the Sales & Marketing general ledger code, 451 is the Missouri region, 4513 is the St. Louis office, and 310 is the financial entity that owns the St. Louis office.

When the system codes an invoice, it stores the coding information, along with the amounts for each coding block in what is called a distribution grid. The distribution grid may also contain various optional fields such as item number, item description, unit price, unit of measure, project number and any other fields as determined by the organization.

Figure 4:
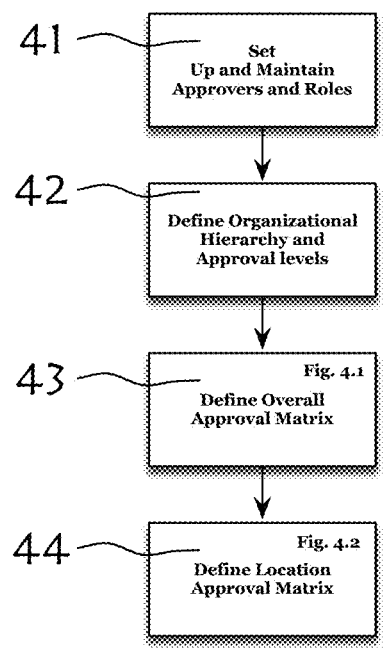
FIG. 4 is a diagram depicting the steps required to set up and maintain the approval matrix, in accordance with one embodiment of the present invention.

In Block 33, the user next defines what columns are appropriate in the coding matrix for their organization. Again, this can often vary widely by organization. Default columns are the vendor category, vendor name, Vendor ID, Questions/Question Answers, Grid, Description, Description Service From/To Date, Document Type, Changes to Index Fields, Segment 1, Segment 2, Segment 3, Segment 4 . . . Segment N. However, the user can add or remove any columns they wish, except for the vendor category, vendor name, vendor ID, Questions/Question Answers, Grid, and the segment fields, as these are a basic necessity to code an invoice. A sample coding matrix is shown in FIG. 4.1.

The Vendor Category is a grouping of vendors around a common type of expense. For example, an organization might have marketing, human resources, information technology or other categories. Since many vendors within a category are coded to many of the same accounts, it helps system users (typically a system user designated as an accountant) to define which category each vendor belongs to. It also helps in the approval matrix, since these vendors will follow the same or similar approval paths. When users look at vendors by category, they will see that they should following the same coding rules and approval paths, so it simplifies both the coding and approval matrices. Each vendor is defined by the vendor ID that exists in the accounting system, which is needed when a file is sent from the system to the accounting system for import. The vendor name is associated with the vendor ID, which is helpful for system users (typically a system user designated as an accountant) to identify the vendor since they know the name but usually not the vendor ID.

Questions and Question Answers define the information the system needs to properly code an invoice if it needs more than the vendor and location. The system can utilize the other header fields on the invoice (invoice number, invoice date, amount, bill-to or ship-to address (synonymous with the location), or purchase order number) to code the invoice. For example, based on the invoice date it may decide to code it to an expense account if the date is in the past or a prepaid account if the date is in the future. In another example and embodiment, if an invoice's description in the body of the invoice is "landscape" or "repairs" the system will determine if it is coded to the appropriate GL code for landscaping or general repairs, since the vendor may provide either service. By asking the processor a query as to whether the invoice has one or the other keyword, the system can properly code the invoice. This is often in the form of a query such as "Does the invoice state it is for Landscaping?" If the answer is Yes, then the system codes it to the landscaping account, otherwise if it is No, then it codes it to general repairs. Through OCR, the system can also answer the queries by looking for those keywords on the invoice to make the same determination. The grid is similar but is simply a list of information that needs to be provided to properly code the invoice. For example, a utility bill may breakout charges by location and the charges by location need to be entered (or derived from OCR) to properly code the charges to each location.

The coding matrix also has the ability to pass a description to the invoice recorded in the accounting system. This is typically some text, often followed by dates of services, such as "Electricity Charges from 01-2018 to 02-2018." The system can also modify the document type for the invoice that is stored in the database. This is useful if the organization wishes to simply search for utility invoices without needing to search for all of the utility vendors. Lastly, the system can also change any other header fields for the invoice in the system. It may want to change the location that an invoice pertains to, or it may want to create an invoice number where none exists, in the case for example of where a utility vendor provides an account number on an invoice but not an invoice number.

The most important part of the coding matrix, of course, is the coding. Therefore the coding matrix has columns for each segment of the chart of accounts, where it will define the coding for that particular invoice. These can be set values, values that change by location, allocations, formulas or some combination.

Once the columns have been defined, in Block 34, the user can fill in the coding rules for each vendor. FIG. 3.1 shows an example of a coding matrix for several vendors. In an embodiment, the user does not need to define any of this information and the system can learn the rules based on how approvers code invoices in the system. This will be discussed later.

Coding may change over time for various business reasons. For example, an organization may close a location and may wish to code invoices for that location differently to a closure account to track those expenses separately. To accommodate this, the system in an embodiment allows effective dates to be associated with coding rule changes so that organization managers can set up a rule at their leisure and let the remote server 14 properly code invoices starting on a future date.

In another embodiment, the system also has the ability to add additional information to the invoice data that accounting or other organization managers may find useful. In this case, it may add a description "Catering Charges for MMDDYY", where MMDDYY is the date of the invoice. In fact the system allows for any invoice or header line items to be automatically modified by the system before the data is sent into the organization's accounting system.

As an example, the system may take an invoice from Cable One, a cable TV company, add a description of "Cable Services for MMMYY" (where MMMYY is the month and year of the invoice), change the document type to "Utility Invoice", change the invoice number to add "-MMYY" to the end of the account number, and allocate the expense between two offices since the charges are for two offices, not one office, with 60% allocated to the Seattle, Washington office and 40% to the Tacoma, Washington office.

In some cases, information is on the invoice that is not in the header or line items and instead is in the body of the invoice. In an embodiment, the system can look for that information if the invoice went through an OCR or some other data capture process where non-header and line item information was captured and use that information to properly code the invoice, or it can route it to a processor or approver and ask a series of queries to determine the correct coding. For example, if the data received included the dates of service on an invoice (which are not in the header), and it is for a maintenance contract, and the invoice date is one month into the contract, the system may have a coding rule to code one-third of the amount to the proper expense account and two-thirds to a prepaid expense account for proper accounting, and possibly to a different cost center as needed. In another example, the matrix shows that the landscaping company for a certain office provides both landscaping and repair and maintenance services. Typically, such a vendor would have a description of the services provided on the invoice. In this case where the data did not get captured electronically, the system would route the invoice to a processor and ask, "What is the amount for repair and maintenance services?" Once the processor entered that amount in the box provided, the system would then code the amount entered to the proper repair and maintenance account and the remainder to the landscaping account.

The system can also perform calculations as needed to properly code invoices such as allocating the tax amount across multiple line items, allocating across multiple cost centers, automatically accruing tax where no tax was provided on the invoice, etc.

There are 5 levels of automated coding:
(1) Coding of one static distribution line.
(2) Coding of one distribution line where coding of any segments varies based on location or other header information.
(3) Allocation of multiple distribution lines where coding of any segments varies based on location or other header information.
(4) Coding of one or more distribution lines where coding of any segments varies based on non-header information pulled off of the invoice.
(5) Coding of one or more distribution lines where coding is a calculation based on header or non-header information.

The system also has the ability to learn coding based on how people code the invoices manually using the system. This is useful because often no one in a mid-sized or large organization knows how all invoices should be coded; only certain individuals in specific departments have such knowledge.

Figure 6:
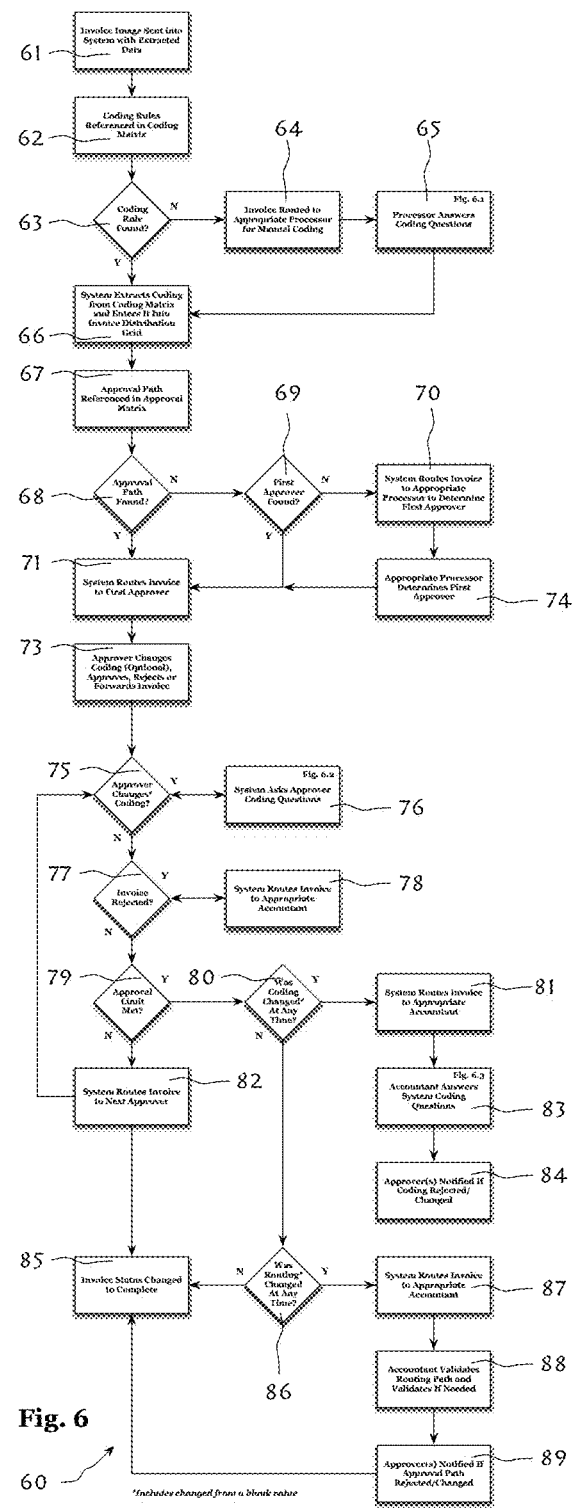
FIG. 6 is a diagram depicting the steps executed by the system to automatically code invoices across all segments of the chart of accounts and automatically route those invoices for approval, in accordance with one embodiment of the present invention. This includes the functionality whereby the system uses machine learning to learn the correct coding and approval routing paths if users change them or, optionally, processors (including accountants) within the organization change them.

As shown in FIGS. 6.1, 6.2 and 6.3, the system has a series of logical decision trees that let approvers code invoices in the system, enabling the system to use machine learning to build rules based on this coding. As mentioned previously, however, depending on who actually does the coding it can be done incorrectly, so the system can also optimally route invoices to accountants at the organization to let them decide if such coding is correct before creating a rule that will be executed automatically the next time that invoice enters the system.

Approval Matrix Set Up and Maintenance

Approvals in mid-sized to large organizations generally follow two types of approval paths: irrespective of location (usually at the corporate office) or according to location. For example, a vendor category of general office expenses (office supplies, copier services, etc.) and specific vendors within that may follow one approval path for the corporate office but a different approval path based on the appropriate approvers at each non-corporate office; e.g., marketing expenses may be only approved by the corporate marketing department but never at the non-corporate office level.

To accomplish this, the system has an overall approval matrix and a location-specific approval matrix, which is referenced by the overall approval matrix. In this manner, the system can have specific approval paths that ignore the location-specific approval paths as needed.

The overall approval matrix starts with the same key value as the coding matrix: vendor category. Within that vendor category, locations and specific vendors are also referenced. The specific vendors can be named, or they can be all vendors used for that combination of vendor category and location. Once that is known, the approval path is a list of organization roles and approval limits for that role and the vendor category/location/vendor combination. Approval levels start at zero (where a manager does not have approval authority but nevertheless "approves" the invoice, mostly to validate that the goods/services have been received and are satisfactory) and then go from the first approval level through to the last approval level. Each approver role has a limit up to a certain amount, with the next approver having an approval limit greater than the previous approver in the approval path. In an embodiment, the system can allow for multiple approvers at the same approval level.

The approval matrix can reference a location-based role to allow for the location-specific approval matrix to govern the approvals. This is critical for mid-sized and larger organizations because they generally have approvals by location. For example, a restaurant chain has delivery of food, beverages and other goods and services from its vendors. Only the restaurant managers know if these goods and services were delivered properly and were satisfactory. Hence it is common in this scenario for a restaurant manager to have an approval limit up to $1,000 with anything over that amount needing approval by their manager, generally a regional manager, and so on. It would be cumbersome for a system user (typically a system user designated as an accountant) to have to spell out each location on the approval matrix, so allowing a user to designate that "all other locations" follows the location-specific approval matrix simplifies both set up and maintenance.

The system uses tables that contain roles within the organization that have a default approval limit. Each role references a specific system user that is also an approver, including the default approving manager for that individual.

FIG. 4 illustrates how the approval matrix is established on the remote server 14. In Block 41, users set up and maintain invoice approvers and roles. This is a web page whereby system administrators can enter (or upload via a pre-formatted spreadsheet) all of the users of the system whether they are an approver, processor, accountant or administrator of the system, along with other demographic information such as location, email address, phone number, etc. In Block 42, each person is assigned into their role in the organization (e.g., CFO, COO, staff accountant, etc.) and the organizational hierarchy that defines each person's (and their role's) immediate approving manager (the person in the organization that generally approves invoices after them). In addition, the approval limit for approvers is entered in terms of dollars or whatever currency is used within the organization and location.

Once these have been defined, the user can define the overall approval matrix for the organization in Block 43. The essential elements of the approval matrix are the Vendor Category, Location, Vendor Name/ID, and the various approval levels (zero level, first level, second level, etc.). Similar to the coding matrix, all of these values are unique to each organization. Each row of the approval matrix represents a unique approval path for the organization; in other words, there should be only one approval path per vendor category (and for the organization overall, although the system will allow them to be repeated) or per vendor if the approval path differs by vendor within the vendor category. To save effort by those entering and maintaining the approval matrix, the system allows for users to select a drop down of "All Other Locations" in the location column to reference the location-based approval matrix. In addition, the system allows for users to select a drop down of "All Other Vendors" in the vendor field to reference all vendors within that vendor category other than those listed, so the system user (typically a system user designated as an accountant) does not need to list all vendors in that vendor category (all vendors were assigned to a vendor category when the coding matrix was completed). In this way, the system allows for efficient entry and maintenance of the approval matrix. For each approval path, individual roles are entered at each approval level along with the correct approval level for each role. Since the system knows the person associated with each role, it enters their name and vice-versa during entry. In an embodiment, the system allows for zero level approvers, whereby the approver does not have approval authority but is nonetheless part of the approval path. An example would be a secretary that receives PC's at the receptionist desk whereby their approval constitutes receipt of the PC's. A sample overall approval matrix can be seen in FIG. 4.1.

Like the coding matrix, the approval matrix has vendor category and vendor name. It then has columns for each level of approval within the organization. A smaller organization may have no more than three or four approval levels, while a large organization may have eight to ten.

Approvers start in the first level and go sequentially to the last approval level. Each approver for that particular vendor has an approval limit and a role within the organization; by tying approvals to the role, if someone changes roles (a frequent occurrence) the approval matrix will not need to be changed. The name is inherited from the list of Approvers and roles. In an embodiment, the system allows the path to skip levels, if for example, a specific approval level is not needed.

Approval paths may change over time for various business reasons. For example, an organization may close a location and may wish to route invoices for that location to a person at the corporate office. To accommodate this, the system in an embodiment allows effective dates to be associated with approval paths so that organization managers can set up a rule at their leisure and let the remote server 14 properly route invoices starting on a future date.

Once the overall approval matrix has been set up, in Block 44 system users (typically either a system administrator or an accountant) can set up the location-based approval matrix, if needed (organizations with only one location may not need this). This approval matrix is used for approvals solely at the location level. The matrix defines the area or region for each location, the location name and number (referencing the chart of accounts), and then the approval levels for each role and person. A sample location-based approval matrix can be seen in FIG. 4.2.

Utilizing both the overall and location-based approval matrix, any invoice can be properly routed automatically using the system for a large and complex organization.

Establish Notifications

Figure 5:
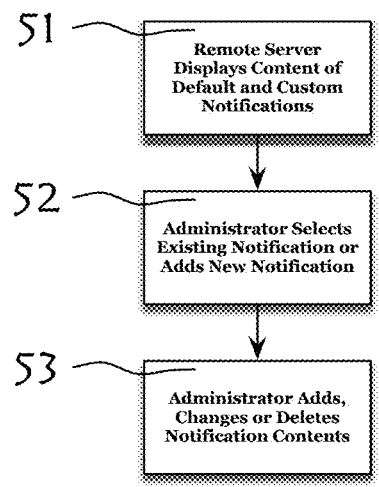
FIG. 5 is a diagram depicting the steps required to set up and maintain the notifications used by the system, in accordance with one embodiment of the present invention.

The last piece to be set up before invoices can be automatically coded and routed are the notifications used by the system. In one embodiment, the remote server 14 automatically sends out notifications to system administrators, approvers, processors, and accountants as system events occur such as invoices submitted, invoices routed to user's inboxes, etc. The system has many default notifications for these events but also allows system users (typically the system administrator) to change the content of these notifications as well as add new notifications based on criteria for their company. FIG. 5 schematically illustrates the process of establishing notifications. When logged into the remote server 14, the remote server displays (at 51) and the system user can view notifications, each of which has a name. The system user can create a new notification from scratch for a variety of system events and/or select an existing notification (at 52) and add, change, or delete the content of the notification (at 53), for example change the content of the notification including email subject, message text, and formatting. Notifications can take a variety of formats including emails, SMS/MMS messages, phone calls, and other types of audio, visual, and/or textual formats.

Invoice Coding and Routing

The coding module determines invoice coding based on the information on the invoice and the coding matrix. Whether an invoice is received on paper or electronically, the invoice (including the information on the invoice) needs to be entered into the accounting system for processing. This includes invoice header data fields such as vendor, invoice number, invoice date, purchase order number (if applicable), and total amount. It also may include invoice detail fields such as item number, item description, quantity, unit of measure, unit price, and amount. Depending on the vendor and the type of goods purchased or services provided, there may be other fields that appear on an invoice such as service dates, detailed descriptions of services performed, tax information, and other information.

If the invoice is received electronically (invoice data, not an image of an invoice), all of the data needed to process the invoice is usually already present in the data file. If the invoice is received in the mail or as an image, the data can be captured manually through hand keying or the invoice can be run through optical character recognition (OCR) software or other methods of data capture known in the art to retrieve the information so that the system can process the invoice. In Block 61, a copy of the invoice together with the invoice data is sent into the Remote Server 14 to begin processing of the invoice.

When the Remote Server 14 in Block 61 receives an invoice, it triggers the Remote Server 14 to look up the relevant coding rules in the coding matrix in Block 62. As mentioned previously, the coding matrix consists of rows and columns defined by the system user (typically a system user designated as an accountant) or learned by the system as Approvers code invoices in the system. The system looks up the specific row and column with the values contained in the specific invoice to find the coding rules. In Block 63, if it does not find any rules for this particular invoice, it will route it to the appropriate processor for manual coding. This may happen if the invoice is from a new vendor to the system or if there is information on the invoice that is not in the coding matrix. For example, a utility invoice may have different coding based the account number on the invoice. If a new account number appears, the system will not have a rule for that particular account number.

When the processor receives the invoice, they will enter the appropriate coding into the distribution grid in Block 64. If they do not know the coding, in an embodiment they have the option of routing it to someone else in the organization (including a processor) who may know the correct coding. If this happens, that person will code the invoice and return it to the processor. Once the correct coding is entered, in an embodiment, in Block 65 the system will ask a series of queries in FIG. 6.1.

If the system found a coding rule or if the processor defined the coding rules in FIG. 6.1, the system in Block 66 will then extract the proper values from the coding matrix, enter those values into the distribution grid in the system for all segments of the chart of accounts, and enter or change values of any other header and detail fields.

Once the system has coded an invoice, it will then electronically route it for approval, also using a series of matrices that determine the correct approval routing. Routing is based on the approval matrix of the organization as defined in FIG. 4. The Remote Server 14 will look in the approval matrix to see if a row exists for this particular vendor and/or coded segments in the chart of accounts in Block 67. In Block 68, if it finds an approval path, using the system's workflow component, it routes invoices for approval through the approval matrix. If it cannot find an approval path for this invoice, i.e., it was not defined, in Block 69 it will look on the invoice to see if a name was mentioned by the vendor. Frequently, vendors will put the name of the person who ordered the good or service on the invoice; this person is often the first approver or knows who is the approver. In an embodiment, the system uses fuzzy logic to look up the name in the list of Approvers to find the correct first approver; for example, Steve Jones may be listed as Stephen Jones in the list of Approvers. If the system cannot determine a first approver, in Block 70 it will route it to a person designated in the system as the processor responsible for determining who should approve this invoice; this is a system setting defined in Block 21. The processor will decide who is the first approver in Block 74. Whether the system knew the first approver or if it was determined by the processor, the Remote Server 14 in Block 71 will route it to the first approver in the organization.

The approver will receive a notification that an invoice has landed in their Inbox. Once they log on to the system on the Remote Server 14, in Block 73, the approver can code the invoice if the coding is blank or change the coding already there. They then can either approve, reject, or forward the invoice to someone else without approval or rejection.

In Block 75, if the approver changed the coding, the Remote Server 14 in Block 76 will ask the approver a series of queries in FIG. 6.2 so it can use machine learning how to correctly code the invoice the next time it comes into the system. If the approver rejects the invoice in Block 77, it is routed in Block 78 to an accountant designated within the organization to handle invoices from this specific segment of the organization. An accountant should review it to determine if it was proper to cancel the invoice and not pay it, since the repercussions to the rest of the organization could be severe if it was erroneously cancelled. Lastly, the Remote Server 14 in Block 79 will see if the approval limit designed in the approval matrix was met by the last approver, i.e., did the last approver have sufficient approval authority to complete approval of the invoice?

If they did, then the Remote Server 14 will determine if the coding was changed by any approver in Block 80. If so, and if it was set up in Block 21 as a system setting, in Block 81 the Remote Server 14 will route it to an accountant designated within the organization to handle invoices from this specific segment of the organization. The accountant will then, in Block 83, answer a series of queries in FIG. 6.3 to help the system use machine learning how to properly code the invoice the next time it comes into the system. In an embodiment, and optionally (also defined in Block 21), the approvers of that invoice will receive a notification in Block 84 letting them know the proper coding of the invoice. This also gives them the opportunity to challenge the coding that the accountant used if they think it is incorrect and will not hit their budget in the way they believe it should. This reinforces the discussions within the organization on how to properly code invoices given the complexity in mid-sized to large organizations.

If the approval limit was not previously met for this invoice, the Remote Server 14 in Block 82 will route it to the next approver in the approval path. The Remote Server 14 then in Block 85 changes the status of the invoice to complete. Once it is completed, it can be extracted automatically into the accounting system.

After this, however, the system will also see in Block 86 if the routing path needs to be updated. If any user routed the invoice differently than the routing path in the approval matrix, the Remote Server 14 in Block 87 will, in an embodiment, and optionally defined in Block 21, route it to an accountant designated within the organization to handle invoices from this specific segment of the organization. In Block 88, the accountant will review the routing path taken by the invoice and determine if it needs to be updated and update the approval matrix accordingly. In an embodiment, and optionally (also defined in Block 21), the approvers of that invoice will receive a notification letting them know the proper approval path of the invoice. This also gives them the opportunity to challenge the approval path that the accountant used if they think the path is incorrect and the invoice may not be reviewed by all of the appropriate people within the organization. This reinforces the discussions within the organization on how to properly approve invoices given the complexity in mid-sized to large organizations.

Processor Answers Coding Questions

To properly establish the correct coding rules for an invoice, the system in FIG. 6.1 will ask the processor a series of queries to gather the appropriate information. In Block 611 the system will display a form that allows the processor to determine which fields are necessary to properly code the invoice and which behaviors the system needs to follow to properly handle the invoice. The processor can choose one or more fields that they want the system to utilize to automatically code the invoice.

The first option in Block 612 is the most critical and is not optional. It is where the processor defines the queries that the system will ask to properly code the invoice. This is only necessary if the invoice from that particular vendor can be coded in more than one set of values for the entire series of chart of accounts segments. In a mid-sized to large organization, where the coding is complex, this occurs a majority of the time, whereas the reverse is true for a smaller organization. The query can be about anything on the invoice or even something not on the invoice and it is the critical piece of information that helps the system determine which way to properly code the invoice. For example, a simple query may be "Is the account number 123456"? If the answer is Yes, the system may code it to 51000-101-00 (where the first segment is the natural account, the second segment is the location, and the third segment is the company), where 101 is the location serviced by that vendor, and if the answer is No it is coded to 51000-201-00, which is a different location. If the query references specific fields or values on the invoice, the processor selects from a dropdown of invoice fields and enters the relevant values for that query. In the example above, the processor would select Account Number from the dropdown, enter the value "123456," and click the answer button Yes or No. In an embodiment, the processor can also write the query in English (or whatever the language approvers use in the organization), which will be asked of the approver as it is routed for approval, and indicate that the answer button Yes or No should be shown to the approver for a response (responses may be other than Yes or No, as defined in the rules, including asking for a value). Block 612 also allows the processor to enter a value for the description that will be entered into the accounting system in the description field. Many organizations want to know the dates of service for a particular vendor, and the system therefore allows from and to dates to be entered for an invoice, which can be taken from either the invoice date or any dates of service printed on the invoice. Again, these are entered through a series of field dropdown buttons referencing data on the invoice.

In Block 613, the processor can optionally select how it wants the system to reference this particular invoice. By default, the system labels all invoices as "Invoice" without a subtype. Some organizations want all of their invoices to be shows as "Invoice" in the system when users report or inquire online about invoices in the system. However, some organizations want to have different invoice types and even subtypes. For example, an organization may want to segregate its utility invoices and have subtypes for electricity, water, sewer, etc.

In Block 614, the processor can optionally tell the system to change the value of any header fields on the invoice, either based on the vendor or on the invoice type defined in Block 613. For example, an organization may want all invoices for a certain location coded to the corporate office because that location was closed down. Again, the processor can select dropdown buttons for each header field and the value(s) it wants for the field.

Properly ensuring that an organization is accruing sales and use tax is critical in the United States and is a major problem. In Block 615, the processor can optionally specify that the system should accrue sales and/or use tax if no such tax is on the invoice. Sales tax is a separate field on the invoice so it its easily discernible. The system will calculate the correct sales tax rate by referencing a series of tax tables in Block 616 that have the appropriate rates by location by type of good purchased or service supplied. In an embodiment, the system may allow third-party services to plug-in to the system to ensure accurate tax rates.

The processor defines in Block 617 exactly how it wants the system to code the invoice through all segments in the chart of accounts for a yes answer to each query above, or a default value if there are no queries or if no queries received a Yes. This is a required value. Again, the processor can select dropdown buttons for each chart of accounts segment and the value(s) it wants for each segment.

Not all invoices should be downloaded into the accounting system. For example, some organizations may have existing data feeds of invoices that they do not want to change. Block 618 allows them to optionally define specific vendors and situations where they do not want the invoices extracted into the accounting system. Again, the processor can select a Yes or No for this value.

It is not uncommon for mid-sized and large organizations to have many different companies or financial entities. In many cases, these companies are not one of the segments in the chart of accounts or they may have an accounting system where this a listed as a dimension outside of the chart of accounts. In Block 619, the processor can define what company or entity pertains to this particular invoice. Again, the processor can select a company or entity for this value. This will be extracted from the invoice data so the invoice is placed into the correct company or entity in the accounting system.

Mid-sized and large organizations often have other fields that need to be determined when coding an invoice. For example, healthcare organizations in the United States have to be careful about which checking account is used to pay invoices; it must correspond to the correct entity (or entities). Block 620 enables the processor to optionally and through a series of dropdown buttons define custom fields that the system can code an invoice to, which are also extracted into the accounting system.

System Asks Approver Coding Questions

If the approver changes the coding on an invoice, in an embodiment, the system needs to learn and understand if this coding is a one-time change or a permanent change to the coding rules. To do this, the system will ask the approver a series of queries to make this determination and also to update the coding rules. In this way, the system can learn the correct way to code invoices on an ongoing, automated basis.

The first query asked of the approver in Block 621 is whether the coding change was a one-time or permanent change. If it is a one-time change, the system will accept it and not change the rules. Then the invoice will be routed to the next approver in Block 622.

If the approver states that the coding change is permanent, then in Block 626 the system looks in the rules to see if the approver changed the coding to other valid coding for that particular invoice. The system will then ask the approver which information on the invoice prompted the approver to change the coding and will display a list of invoice fields that the approver can select. Once the approver selects the fields, the system will ask them to explain in their own words why this altered the coding in Block 628; this information will be potentially relayed once the invoice has been fully approved to an accountant for review and approval. The invoice will then follow the approval path to the next approver in Block 622.

Otherwise the system looks to see if the coding is to one natural account associated with the location to which the goods and or services have been provided; this is static natural account coding that is always true for this invoice for this location, but can vary for other locations based on other information on the invoice such as the location. It does this by seeing in Block 629 if there is only one line of coding and the location on the invoice matches the location coded in the location segment in the chart of accounts. If this is true, then it asks the approver in Block 630 if the coding is valid for just this location. If the answer is yes, then the invoice will always be coded to the same values in all segments of the chart of accounts. The invoice will then follow the approval path to the next approver in Block 622.

If the coding is not to one natural account, the system looks to see if the coding is an allocation of multiple distribution lines, where coding of any segments in the chart of accounts varies based on the location or other information on the invoice. It does this by seeing in Block 631 if there are multiple lines of coding and the location on the invoice for every distribution line matches the location coded in the location segment in the chart of accounts. If this is true, then it asks the approver in Block 632 if the coding is valid for just this location, all locations, or they are not sure. The invoice will then follow the approval path to the next approver in Block 622.

Finally, if the coding is not to one natural account and is not an allocation of multiple distribution lines, the system looks to see if the coding consists of one or more distribution lines, where coding of any segments in the chart of accounts varies based on any other information on the invoice. It does this by seeing in Block 633 if there are multiple lines of coding and the location on the invoice for any distribution line differs from the location coded in the location segment in the chart of accounts. If this is true, then it asks in Block 634 if the approver if the coding is based on a percentage allocation or information contained on the invoice. If this is true, then in Block 635 it calculates the percentage allocated to each distribution line and then displays those percentages next to each distribution line in Block 636 and asks the approver if those percentages are valid; this allows the approver to change the percentages and recalculate the amounts based on their input. If the answer in Block 634 is that it is based on other information on the invoice, then it will ask the approver in Block 637 what information on the invoice determined the coding and display a list of fields to select from. Then in Block 638 it will ask the approver to explain in their own words how the content of the fields selected made them change the coding. Their answer will be captured by the system and associated with the invoice, and the invoice will then follow the approval path to the next approver in Block 622.

The invoice will follow the approval path to the next approver in Block 622. If the system administrator set the option to have these coding changes routed to accountants for approval, then in Block 623 it will make this determination and in Block 624 route the invoice to an accountant designated for this segment of the organization to answer system coding queries in FIG. 6.3. If the invoice is not routed to the accountant, or once it has been, the system automatically updates the coding rules in the coding matrix accordingly in Block 625.

Accountant Answers System Coding Questions

As mentioned above, in Blocks 81, 87 and 624, the invoice may be routed to an accountant to review, approve, and/or correct the coding for the invoice in question. If so, the accountant will receive a notification that an invoice has been routed to their inbox in Block 6311. Once they open the invoice in their inbox in Block 6312, they will see a screen which displays the original coding (if any) in the coding matrix along with the coding from the approver(s) and answers to their queries (including if they were not sure about the proper coding) so that the accountant can understand the logic of the approver in coding the invoice. They are then presented with two option buttons: Reject the Coding or Create New Coding Rule. In Block 6313, if the accountant rejects the coding it will then in Block 6314 present a list of standard rejection reasons to the accountant such as: Coding Not Valid for this Invoice, Expense Cannot be Capitalized, and Other (a free text area for a written explanation). In an embodiment, the system administrator can add to this list. Once one of these reasons is selected, in Block 6315 a notification will be sent to the approver(s) of this invoice letting them know that the accountant has rejected their coding and why. This way, if they have any objections or other information that impacts the coding, they can raise them with the accountant.

If the coding was accepted, then the system will need to build rule(s) for the new coding. In Block 6316 it will display a form to the accountant to assist them in defining the coding rule and ask them, "Which of the following rule types define how this invoice should be coded?" The query will be accompanied by checkboxes next to a list of rule types with a definition and example for each to help the accountant understand which rule is appropriate for that given situation. These rule types include but are not limited to: Consistent Coding (Block 6317), Consistent Coding with Variable Locations (Block 6321), Coding Based on an Allocation or for Accrual Purposes (Block 6323), Coding Based on Question(s) (Block 6325), Coding Based on a Grid (Block 6327), Coding for Capitalization (Block 6329), Other Coding Rules (defined by the system administrator) (Block 6317).

If the accountant states the coding is always consistent (does not change based on any information on or off the invoice for that vendor), then in Block 6318 the system will display the distribution grid with the coding as entered and/or approved by the last approver in the approval path. The accountant can either accept the coding or change the coding here and the system will create a new rule in Block 6319 based on the coding supplied.

If the coding is consistent with a variable location, then in Block 6322 the system will display the distribution grid with the coding as entered and/or approved by the last approver in the approval path, with the phrase "Location as Indexed" to show that the distribution line will vary based on the location on the invoice. The accountant can either accept or change the coding here and the system in Block 6319 will create a new rule based on the coding supplied.

If the coding is an allocation across multiple distribution lines, then in Block 6324 the system will display the distribution grid with the coding as entered and/or approved by the last approver in the approval path, with percentages next to each distribution line. The accountant can either accept the coding or change the percentages here and the system will create a new rule based in Block 6319 on the coding supplied.

If the coding is based on the answer to one or more queries, then in Block 6326 the system will display a form with three columns plus the distribution grid and multiple rows. On each row, the first column will have a dropdown list to allow the accountant to select and enter a query in the form of "If" <Field Name> <Operation> <Value>"Then" <Yes/No Button> or Value and the distribution line for coding. In this way the accountant can instruct the system to code the invoice based on any value in any field on the invoice. The system will then ask a series of queries; when the answer is yes, it will be coded to that defined distribution line, while if the answer is no, it will ask the next query in sequence until all queries are exhausted. Alternatively, if the system is asking for a value on the invoice, it is not a Yes/No Button but instead a blank field for the processor to enter the value being asked. The accountant can also just fill in text so that the system will route an invoice to a user and ask them the appropriate query so the system can code the invoice properly. The accountant can either accept the coding or change the percentages here and the system will create a new rule based in Block 6319 on the coding supplied.

If the coding is based on a calculation or formula (also known as a grid), then in Block 6328 the system will display a form with multiple lines, each labelled with a letter such as A, B, C, etc. The accountant can define each value from the invoice in terms of a letter by entering the pertinent Field Name. This value can either be entered manually by a processor or a user, or through OCR of the invoice. Then the distribution lines can be listed whereby if a formula checkbox is checked, the accountant can enter a formula referring to each value by its previously defined letter (A, B, C, etc.) so the system can calculate the resulting amount for that distribution line. In this way, the system can calculate the amounts for any defined distribution line based on any information in the invoice. The accountant can either accept the coding or change the percentages here and the system will create a new rule based in Block 6319 on the coding supplied.

Sometimes coding can change if the invoice is to be capitalized. In Block 6330 the accountant can define the vendors and capitalization thresholds and resulting capitalization coding that will substitute expense coding as needed.

Lastly, anything can be programmed into the system as needed and if the rule does not fit one of the above scenarios, in Block 6332 the system will display a message to call system support to ask for help in defining custom coding rules in the system.

The accountant can always define the coding rules in FIG. 3.1 if he/she prefers.

Data Extraction and Reporting

Figure 7:
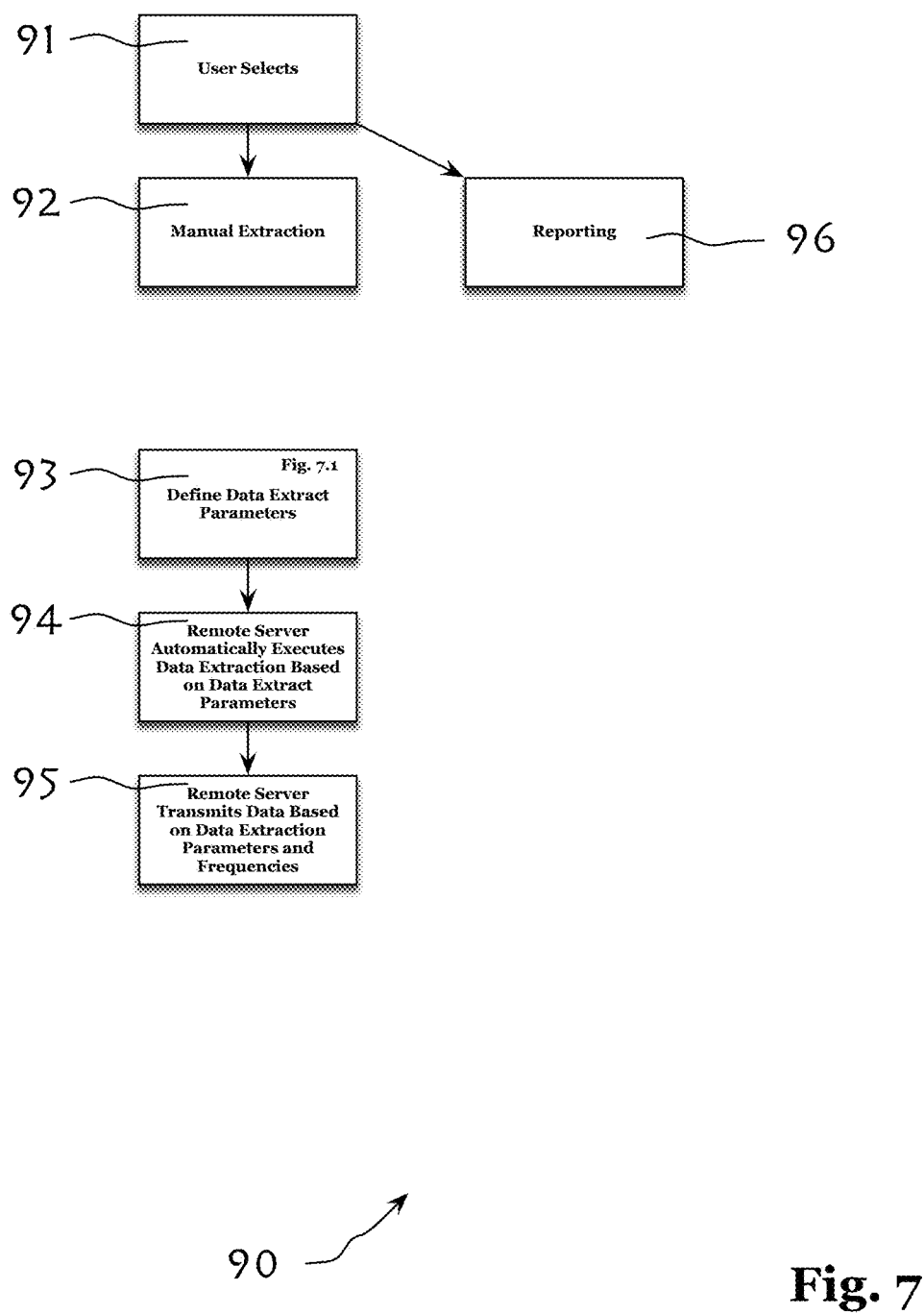
FIG. 7 is a diagram depicting the steps required to set up and maintain the rules whereby the system will automatically extract invoice data from the system database into the accounting system to eliminate manual data entry of invoice data into the accounting system, as well as generate reports as needed, in accordance with one embodiment of the present invention.

In one embodiment, the system administrator determines data extract parameters as needed during system setup (at Block 26 in FIG. 2). FIG. 7.1 schematically illustrates the process of how the remote server 14 selects data extract parameters for automatic extraction of invoice data by the remote server 14. This is required if the invoice data needs to be exported into an external accounting system, which is often the case. One of the key benefits of the system is the fact that the invoice data resides in a database and can be transmitted to an external accounting system versus requiring a person to manually enter invoice data directly into the external accounting system, which would be a duplicate entry of information.

The remote server 14 identifies potential data extract methods (at Block 911). On a series of web pages made available by the remote server 14, the system administrator first selects the potential data extract methods such as an API format, flat file, SQL database, stored procedure or web service identified by the remote server 14 (at Block 916).

The remote server 14 next identifies (at Block 912) and the system administrator next views a list of invoice fields available for export including the characteristics of those fields such as field length, field type (numeric, alphanumeric, date, etc.), etc. and chooses (at Block 917) the fields to be exported along with any transformations required by those fields such as numeric transformations (addition, subtraction, etc.), text transformations, or other transformations. The remote server 14 next identifies (at Blocks 913 and 914) and the system administrator next selects possible extract formats such as API, CSV, Excel, text, PDF, etc. (at Block 918), and the extract frequencies (upon form submission, hourly, daily, etc.) (at Block 919). Lastly, the remote server 14 identifies (at Block 915) and the system administrator selects (at Block 920) the mechanism used to send the file to the other system such as REST API, FTP, secure FTP, etc. Based on these parameters, invoice data is automatically sent to the external accounting system when invoices are submitted to the remote server 14.

Referring to FIG. 7, once the invoice data has been stored in the database by the remote server, it can be extracted either automatically (at Block 94) or manually (at Block 92) by the system administrator or any other remote server user. The user can select (at Block 96) reporting to generate reports of any or all of the data resident in the system pertaining to account coding and approvals; a series of reports for common use cases (e.g., coding by invoice) are available. If data extract parameters have been defined for the system in Block 93 (refer to FIG. 7.1), automatic data extraction occurs by the remote server based on those parameters (at Block 94) and the invoice data is transmitted by the remote server 14 based on those parameters and frequencies to the recipient system (at 95). Alternatively, a system administrator can manually extract invoice data while logged on to the remote server from the database for the invoice in much the same way that a system administrator can specify automatic extraction as shown in FIG. 7.1. Specifically, the user can interact with the remote server 14 (e.g., via a web page) by selecting similar parameters (e.g., as those shown in FIG. 7.1) for a one-time invoice data extraction.

A system administrator utilizes the remote server 14 in Block 92 to manually extract invoice data from the database according to the data extract parameters defined earlier.

EXAMPLES

The examples described below help understand the usefulness of the invention. The examples reference a fictitious healthcare company with offices located around the United States and a corporate office. The company has a chart of accounts with 4 segments:
 (a) First segment: natural account with 5 digits
 (b) Second segment: a region code of 3 digits
 (c) Third segment: a location code of 4 digits
 (d) Fourth segment: a financial entity code of 4 digits The company has 12 regions, each of which has two or more locations. The location approval matrix has five approval levels (with a zero level approver) as does the corporate approval matrix. Generally speaking both the corporate and locations have the same approval levels at the same organizational level as is best practice, as follows:
 (a) 1st level: Manager up to $1,000
 (b) 2nd level: Director up to $10,000
 (c) 3rd level: Vice President up to $25,000
 (d) 4th level: CFO up to $100,000
 (e) 5th level: COO over $100,000

The sample coding matrix in FIG. 3.1 and the general approval matrix in FIG. 4.1 and the location approval matrix in FIG. 4.2 can be referenced in these examples.

In the first example, coding of one static distribution line, there is an invoice from Sick Metrics, Inc. in the amount of $3,282 as shown in FIG. 9.1. The coding matrix in FIG. 3.1 is used by the system to assign coding of 15000-100-100-100; in fact, it is static and always coded this way. This is the simplest type of coding. The system will also automatically enter a description of "Sick Metrics MMMYY", where MMMYY is the month and year of the invoice date. Using the Vendor Category of Human Resources, the system will look up the appropriate line in the Approval Matrix. In this case, the vendor name is listed under the Vendor Category of Human Resources, so it will utilize the approval path of "Sick Metrics, Inc." and route it first to Marjan K as a zero-level approver, then to Kim S as the last approver since the invoice total is $3,282 and Kim's approval limit is $10,000. Once Kim has approved it, the system will send the data to the accounting system for import.

In the second example, coding of one distribution line, where coding of any segments varies based on the location or other header information, there is an example from Better Radiation Therapy LLC shown in FIG. 9.2, which has the Vendor Category of Equipment/Maintenance in the amount of $3,729. The coding can vary by location for this vendor and in this example, the equipment was purchased for the Leesburg, Florida office, so the system will look up the vendor in the coding matrix, which defines the 1st and fourth segments but says segments two and three vary by location (<LOCATION>). So in this case the system will code this invoice to 73950-418-4181-100, where 4181 is the Leesburg, Florida office. The system will also automatically enter a description of "Accuboost MMMYY", where MMMYY is the month and year of the invoice date. To route the invoice for approval, the system will look at the location routing matrix and route it to Rebecca G for approval as she is the General Manager of the Leesburg office. Since she only has a $1,000 approval limit, the system will then send it to the Regional Manager, Joe K. Once he approves it, since he has a $10,000 approval limit, all approvals will be completed and the system will send the data to the accounting system for import.

In the third example, allocation of multiple distribution lines, where coding of any segments varies based on location or other header information, the example is Another Alarm Company in the amount of $350.18 in FIG. 9.3. Since this is an invoice for alarm monitoring services across 5 different offices, it has a predetermined allocation across those offices as follows, which the system will automatically utilize:
 (a) 20% to 60300-427-4272-100
 (b) 13% to 60300-427-4277-100
 (c) 20% to 60300-427-4273-100
 (d) 13% to 60300-427-4278-100
 (e) 34% to 60300-427-4274-100

The system will also automatically enter a description of "Alarm Services MMMYY", where MMMYY is the month and year of the invoice date. Further, it will change the location value in the invoice header in the system to VOH1001000. Once it has coded the invoice, it will route it to the Regional Manager of the Arizona locations, Dan A. Since his approval limit is $10,000, once he approves it all approvals will be complete and the system will send the data to the accounting system for import.

In the fourth example, coding of one or more distribution lines, where coding of any segments varies based on non-header information pulled off of the invoice, the example is An Alarm Company in the amount of $702.99 in FIG. 9.4. In this example, if a range of dates is in the invoice description, it indicates it is for regular quarterly alarm services; since this vendor bills in advance it is all coded to prepaid expenses (15000). However, if no dates are provided, it indicates it is a regular expense and therefore should be coded to alarm expenses (60200). The system will automatically code this invoice based on these rules. If the system was not fed the non-header information pulled off of the invoice (in this case the range of dates), the invoice will be routed to a processor and ask the query, "Is a range of dates provided in the invoice description?" If the processor clicks Yes, then it will ask the processor to input the dates and the system will code the invoice to prepaid expenses (15000). If the processor clicks No, then it would code it to alarm expenses (60200). The resulting coding in this example is 15000-408-4080-100. In addition, the system will automatically enter a description of "Alarm Services MMDDYY (To MMDDYY)", where the range of dates is used if it is available and if not the system uses the invoice date. The system also changes the invoice number to the Account Number on the invoice and MMYY. Lastly, the system will code the second and third segments to the proper region and location, and the proper fourth segment. Since the invoice was for a location, the system will then route it to the General Manager at that location, Michelle R, and since the invoice amount was less than the approval limit for the General Manager, it will be fully approved once the General Manager approves it and the system will send the data to the accounting system for import.

In the fifth example, coding of one or more distribution lines, where coding is a calculation based on header or non-header information, the example is from City of Covington—Occupation Tax Renewal, which has multiple types of expenses (electric, sewer, water, & gas) on its invoice. In this case, an invoice for $4,534.23 was received and is shown in FIG. 9.5. According to the coding matrix, three pieces of data are collected from the invoice: electric charges, electric PCA and ECCR charges, other charges (gas, sewer, water, backflow, and solid waste), and sales tax. This data is either gathered through an OCR of the invoice or by asking for these values from a processor through a query for three separate values: A, B and C. The system then performs a calculation to allocate the sales tax amongst the two natural accounts for electric and other charges, according to the following formula: A+((A/(A+B))*C) to 60400 and B+((B/(A+B))*C) to 60500, where A is the total for Electric (electric charges, electric PCA and ECCR), B is the total for other charges (gas, sewer, water, backflow, and solid waste), and C is the sales tax amount. The other segments are coded to that region, location and company as 451-4515-100. In this case, the description is entered as "Water/Sewer MMDDYY to MMDDYY" with the dates of service pulled from the invoice. In addition, the document type is changed to Utility Invoice and the invoice number is changed to the account number from the invoice and the month and year of the invoice date as MMYY. The invoice is then routed according to the approval matrix to the appropriate location for approval.

A sixth example is a combination of several of the above, from AT&T which bills multiple locations on its invoice. In this case, an invoice for $563.34 was received for account number 1717926415320 and is shown in FIG. 9.6. According to the coding matrix, there are three possible codings for this invoice:

(a) If the invoice was for location 421-4210, the invoice is coded 50% to 73600-421-4210-100 and 50% to 15530-421-4210-100, with the description set to "Telephone MMMYY" and the invoice number changed to the account number on the invoice and MMYY.

(b) If the account number is 137240058, it is coded to 73610-100-1000-100, with the description set to "Data MMMYY" and the invoice number changed to the Account Number on the invoice and MMYY.

(c) Finally, if the account number is 1717926415320, then the coding is based on additional information on the invoice. The invoice breaks out the amounts by location, with each location coded to 73600-XXX-YYYY-100.

In this last example, the account number is 1717926415320, so the system will gather the appropriate amounts on the invoice either through OCR or by asking a processor to enter the values on the invoice for Perimeter, Covington, Lawrenceville, Decatur, Snellville, and Jeffersonville. Once the system has that data it will code the invoice to each of those locations. It will then enter a description as "Telephone MMMYY" based on the invoice date, change the document type to Utility Invoice, change the invoice number to the Account Number on the invoice and MMMYY. It will then route the invoice for approval to the Regional Vice President Marilee D. Once she has approved it, it will be fully approved, as it is well below her approval limit, and the system will send the data to the accounting system for import.

The process and system of the present invention has been described above in terms of functional modules in block diagram format. It is understood that unless otherwise stated to the contrary herein, one or more functions may be integrated in a single physical device and/or software module in a software product, or one or more functions may be implemented in separate physical devices and/or software modules at a single location or distributed over a network, without departing from the scope and spirit of the present invention.

It is appreciated that detailed discussion of the actual implementation of each module is not necessary for an enabling understanding of the invention. The actual implementation is well within the routine skill of a programmer and system engineer, given the disclosure herein of the system attributes, functionality and inter-relationship of the various functional modules, hardware and software components in the system. A person skilled in the art, applying ordinary skill can practice the present invention without undue experimentation.

While the invention has been described with respect to the described embodiments in accordance therewith, it will be apparent to those skilled in the art that various modifications and improvements may be made without departing from the scope and spirit of the invention. For example, the system can be easily modified to incorporate different or additional processes to provide additional user flexibility in connection with creating and managing coding and approval rules and functionality. Accordingly, it is to be understood that the invention is not to be limited by the specific illustrated embodiments, but only by the scope of the appended claims.

I claim:

1. An invoice processing system that manages invoices from a plurality of vendors, comprising:
a server managing a coding matrix comprising a matrix of coding rules across a plurality of segments of chart of accounts for the plurality of vendors, wherein each of the segments has two or more possible values;
a database associated with the server storing the matrix of coding rules;

wherein the server is configured to, upon receiving a particular vendor information for a particular invoice to be processed and a request to provide the appropriate coding and other values, derive from the particular invoice the appropriate coding values from the matrix of coding rules for the particular vendor across all of the segments of the chart of accounts for the particular invoice, including other values independent of the chart of accounts, and to return said request, and wherein the coding values in one or more segments of the chart of accounts vary depending on information contained on the particular invoice, for each distribution line containing one set of values across all of the segments of the chart of accounts for that particular invoice, and wherein the server is configured to code the particular invoice automatically using following automated coding levels based upon specific header and line item data in the particular invoice:

(1) coding of one static distribution line,
(2) coding of one distribution line where coding of any segments varies based on location or other header information,
(3) allocation of multiple distribution lines where coding of any segments varies based on location or other header information,
(4) coding of one or more distribution lines where coding of any segments varies based on non-header information pulled off of the invoice, or
(5) coding of one or more distribution lines where coding is a calculation based on header or non-header information.

2. An invoice processing system as in claim 1, wherein the coding matrix comprises at least one of a percentage and a numeric allocation of the total amount of the particular invoice across multiple distribution lines for all of the segments of the chart of accounts for the particular invoice.

3. An invoice processing system as in claim 1, wherein the coding matrix comprises one or multiple distribution lines, each containing one set of values across all of the segments of the chart of accounts for the particular invoice.

4. An invoice processing system as in claim 1, wherein the coding values in one or more segments of the chart of accounts varies depending on any information contained on the particular invoice including the location on the invoice where goods were delivered or services performed, for one or multiple distribution lines, each containing one set of values across all of the segments of the chart of accounts for that particular invoice.

5. An invoice processing system as in claim 1, wherein:
the coding matrix comprises one or more queries about data on the particular invoice for the particular vendor, and
the server is configured to either retrieve data from the invoice via OCR or electronic form to answer said queries, or display said query to a system user designated as a processor as needed, and
the server is further configured to perform at least one of the following actions:
(a) upon receiving a Yes or No answer to each query, the server derives and returns the coding values in the matrix for one or more sets of values across all of the segments of the chart of accounts for the particular invoice;
(b) upon receiving a No answer, the server triggers display of an additional query about data on the particular invoice for the particular vendor; and
(c) perform a calculation using the values entered to assign coding values and amounts to one or more distribution lines for one or more sets of values across all of the segments of the chart of accounts for the particular invoice.

6. An invoice processing system as in claim 1, wherein the coding matrix comprises at least one of:
(a) an alphanumeric description of the expense for the particular invoice;
(b) a service delivery starting or ending date, or both starting date and ending date, that the system will combine with the alphanumeric description of the expense for the particular invoice;
(c) a document type value for the particular invoice; and
(d) a formula that the system uses to calculate and replace the value of any other header or detail line item field for the particular invoice.

7. An invoice processing system as in claim 1, wherein the server is configured to import the chart of accounts from an accounting system, and provide a system user designated as an accountant with a series of web pages to define and store in the database the segments of the chart of accounts.

8. An invoice processing system as in claim 7, wherein the server is further configured to import vendor information from the accounting system, and provide the accountant with a series of web pages to define and store in the database a list of vendor categories, wherein each vendor is assigned a vendor category.

9. An invoice processing system as in claim 8, wherein the server provides the accountant with a series of web pages to define and store in the database, comprising:
(a) valid columns in the coding matrix;
(b) valid queries and query answers by vendor;
(c) coding rules for each and all segments in the chart of accounts for each vendor for each unique combination of vendor and query;
(d) additional columns in the coding matrix where the server will associate additional data in the database in said columns; and
(e) valid combinations of segments in the chart of accounts in the coding matrix.

10. An invoice processing system as in claim 8, wherein the server is configured to provide the accountant with a series of web pages to further define an approval routing path for each vendor, including zero-level approvers and multiple approvers at the same approval level, further defining the approver roles, names and approval limits by approval level and stores said data in the database.

11. An invoice processing system as in claim 10, wherein the server is configured to provide the accountant to define an approval matrix by location, including zero-level approvers and multiple approvers at the same approval level, further defining the approver roles, names and approval limits by approval level and stores said data in a database.

12. An invoice processing system as in claim 11, wherein the server is configured to automatically route the particular invoice if the particular vendor does not have coding rules in the coding matrix, and to at least one of (a) ask the system user designated as a processor or the accountant with a series of queries to define the correct coding rules across all segments of the chart of accounts including any other fields and stores the coding rules the database, and (b) utilize machine learning using data from the organization as well as coding rules from other organizations to define the correct coding rules across all segments of the chart of accounts including any other fields and stores the coding rules in the database.

13. An invoice processing system as in claim 12, wherein the server is configured to utilize machine learning using data input from a user to define the approval routing path for each vendor and an approval matrix by location, including zero-level approvers and multiple approvers at the same approval level, further defining the approver roles, names and approval limits by approval level and stores said data in the database.

14. An invoice processing system as in claim 13, wherein the server is configured to automatically and successively route a particular coded invoice to at least one system user designated as an approver identified in the approval matrix, display the invoice image with coding from the coding matrix if available, allows the approver to change the coding as needed, asks the approver to approve or reject the particular coded invoice, and stores coding changes and the results of approvals and rejections in the database.

15. An invoice processing system as in claim 14, wherein, if the system user designated as the approver changed the coding on an invoice, the server is configured to ask the approver a series of queries to determine if updated coding rules are required, including whether the coding change is one-time or permanent and what information on the invoice suggested a change in the coding rules, and store the suggested changes to the coding rules in the database.

16. An invoice processing system as in claim 15, wherein, if the approver of the invoice changed the coding, the server is configured to route the invoice to the system user designated as the accountant to validate updated coding rules from the approver, whereby the accountant either rejects the new coding rule or creates a new one, either of which are stored in the database.

17. An invoice processing system as in claim 16, wherein the server is configured to send a notification to the approver if said approver changed the coding and the accountant rejected the coding change by the approver.

18. An invoice processing system as in claim 13, wherein the server is configured to automatically route the particular invoice to the accountant wherein the approver changed the approval routing path, and the accountant either approves the change in approval routing path and further defines the conditions where the routing rule is performed, or rejects the change in approval routing path, and the database stores any changes to approval routing path in the approval matrix in the database.

19. An invoice processing system as in claim 18, wherein the server is configured to send a notification to the approver if said approver changes the approval routing path and the system user designated as the accountant rejected the approval routing path change by the system user designated as the approver.

20. An invoice processing system as in claim 13, wherein the server is configured to use fuzzy logic to determine a correct approver where the name of the approver is on the particular invoice and is used to determine a first approver in the approval routing path.

21. An invoice processing system as in claim 8, wherein the server is configured to provide the system user designated as a system administrator with a series of web pages to define data extract parameters for each vendor including data extract methods, fields and related characteristics, formats, frequencies and transmission types, all of which are stored in a database, and wherein the server is configured to automatically or upon request, extract data from the database based on the defined data extract parameters and transmits said data to another system.

22. An invoice processing system as in claim 1, wherein the matrix of coding rules comprises a table of vendor related information and invoice specific information and other data required for invoice processing, and a plurality of segments of account beyond a natural account.

23. A process of managing invoices from a plurality of vendors, comprising:
providing a server that manages a coding matrix comprising a matrix of coding rules across a plurality of segments of chart of accounts for the plurality of vendors, wherein each of the segments has two or more possible values;
providing a database associated with the server storing the matrix of coding rules;
wherein the server is configured to, upon receiving a particular vendor information for a particular invoice to be processed and a request to provide the appropriate coding and other values, derive from the particular invoice the appropriate coding values from the matrix of coding rules for the particular vendor across all of the segments of the chart of accounts for the particular invoice, including other values independent of the chart of accounts, and to return said request, and
wherein the coding values in one or more segments of the chart of accounts vary depending on information contained on the particular invoice, for each distribution line containing one set of values across all of the segments of the chart of accounts for that particular invoice, and
wherein the server codes the particular invoice automatically using following automated coding levels based upon specific header and line item data in the particular invoice:
(1) coding of one static distribution line,
(2) coding of one distribution line where coding of any segments varies based on location or other header information,
(3) allocation of multiple distribution lines where coding of any segments varies based on location or other header information,
(4) coding of one or more distribution lines where coding of any segments varies based on non-header information pulled off of the invoice, or
(5) coding of one or more distribution lines where coding is a calculation based on header or non-header information.

24. A process as in claim 23, wherein the coding matrix comprises one distribution line containing one set of values across all of the segments of the chart of accounts for the particular invoice, and coding values in one or more segments of the chart of accounts that vary depending on any information contained on the particular invoice including the location on the particular invoice where goods were delivered or services performed, for one or multiple distribution lines, each containing one set of values across all of the segments of the chart of accounts for that particular invoice.

25. A process as in claim 24, wherein the coding matrix further comprises at least one of a percentage and a numeric allocation of the total amount of the particular invoice across multiple distribution lines for all of the segments of the chart of accounts for the particular invoice.

26. A process as in claim 25, wherein the server is configured to utilize machine learning using data from the organization as well as other organizations to define at least one of an approval routing path for each vendor and an approval matrix by location, including zero-level approvers and multiple approvers at the same approval level, further defining the approver roles, names and approval limits by approval level and stores said data in the database.

27. A process as in claim 26, wherein the server is configured to automatically and successively route a particular coded invoice to at least one system user designated as an approver identified in the approval matrix, display the invoice image with coding from the coding matrix if available, allows the approver to change the coding as needed, asks the approver to approve or reject the particular coded invoice, and stores coding changes and the results of approvals and rejections in the database.

28. A process as in claim 23, wherein the server is configured to automatically route the particular invoice if the particular vendor does not have coding rules in the coding matrix, and to at least one of (a) ask a system user designated as a processor or the accountant with a series of queries to define the correct coding rules across all segments of the chart of accounts including any other fields and stores the coding rules the database, and (b) utilize machine learning using data from the organization as well as coding rules from other organizations to define the correct coding rules across all segments of the chart of accounts including any other fields and stores the coding rules in the database.

29. A process as in claim 23, wherein the matrix of coding rules comprises a table of vendor related information and invoice specific information and other data required for invoice processing, and a plurality of segments of account beyond a natural account.

* * * * *